US011487594B1

(12) United States Patent
Ehmann

(10) Patent No.: US 11,487,594 B1
(45) Date of Patent: Nov. 1, 2022

(54) ARTIFICIAL REALITY SYSTEM WITH INTER-PROCESSOR COMMUNICATION (IPC)

(71) Applicant: Meta Platforms Technologies, LLC, Menlo Park, CA (US)

(72) Inventor: Gregory Edward Ehmann, Sleepy Hollow, IL (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/303,697

(22) Filed: Jun. 4, 2021

Related U.S. Application Data

(63) Continuation-in-part of application No. 16/726,492, filed on Dec. 24, 2019.

(60) Provisional application No. 62/905,095, filed on Sep. 24, 2019.

(51) Int. Cl.
*G06F 3/00* (2006.01)
*G06F 9/54* (2006.01)
*G06F 5/06* (2006.01)

(52) U.S. Cl.
CPC . *G06F 9/54* (2013.01); *G06F 5/06* (2013.01)

(58) Field of Classification Search
CPC .............................. G06F 9/546; G06F 9/44526
USPC ......................................................... 719/313
See application file for complete search history.

(56) References Cited

U.S. PATENT DOCUMENTS

| | | | |
|---|---|---|---|
| 5,136,714 A | 8/1992 | Braudaway et al. | |
| 5,214,759 A | 5/1993 | Yamaoka et al. | |
| 5,617,537 A | 4/1997 | Yamada et al. | |
| 6,456,628 B1 * | 9/2002 | Greim | G06F 13/24 711/E12.013 |
| 7,302,548 B1 | 11/2007 | Mitten et al. | |
| 7,711,443 B1 | 5/2010 | Sanders et al. | |
| 8,244,305 B2 | 8/2012 | Ramesh et al. | |
| 9,032,128 B2 * | 5/2015 | Bonola | G06F 9/4812 710/268 |

(Continued)

FOREIGN PATENT DOCUMENTS

| | | |
|---|---|---|
| AU | 2004297922 B2 | 7/2008 |
| WO | 2005/057964 A1 | 6/2005 |
| WO | 2012/061151 A1 | 5/2012 |

OTHER PUBLICATIONS

Trio Adiono, An Inter-Processor Communication (IPC) Data Sharing Architecture in Heterogeneous MPSoC for OFDMA . (Year: 2018).*

Qiu et al., "Low-Power Low-Latency Data Allocation for Hybrid Scratch-Pad Memory," IEEE Embedded Systems Letters vol. 6, Issue: 4, Dec. 2014, pp. 69-72.

(Continued)

*Primary Examiner* — Lechi Truong
(74) *Attorney, Agent, or Firm* — Shumaker & Sieffert, P.A.

(57) ABSTRACT

The disclosure describes techniques for interrupt and inter-processor communication (IPC) mechanisms that are shared among computer processors. For example, an artificial reality system includes a plurality of processors and an inter-processor communication (IPC) unit. The IPC unit includes one or more doorbell registers, wherein each doorbell register is associated with a uniquely assigned source processor and a uniquely assigned target processor. Each doorbell register is further configured to store doorbell data indicative of whether an interrupt is a high priority interrupt or a low priority interrupt. The IPC unit may also include one or more FIFO (first-in first-out) memories configured to store data associated with each interrupt.

20 Claims, 17 Drawing Sheets

(56) References Cited

U.S. PATENT DOCUMENTS

| | | |
|---|---|---|
| 9,111,548 B2 | 8/2015 | Nandy et al. |
| 10,241,941 B2 | 3/2019 | Fader et al. |
| 10,372,656 B2 | 8/2019 | Varadarajan et al. |
| 2002/0091826 A1 | 7/2002 | Comeau et al. |
| 2003/0031320 A1 | 2/2003 | Fan et al. |
| 2005/0111472 A1 | 5/2005 | Krischer et al. |
| 2005/0169483 A1 | 8/2005 | Malvar et al. |
| 2005/0244018 A1 | 11/2005 | Fischer et al. |
| 2006/0014522 A1 | 1/2006 | Krischer et al. |
| 2008/0209203 A1 | 8/2008 | Haneda |
| 2010/0111329 A1 | 5/2010 | Namba et al. |
| 2015/0112671 A1 | 4/2015 | Johnston et al. |
| 2015/0134765 A1 | 5/2015 | Holmberg et al. |
| 2015/0213811 A1 | 7/2015 | Elko et al. |
| 2015/0355800 A1 | 12/2015 | Cronin |
| 2016/0055106 A1 | 2/2016 | Ansari et al. |
| 2016/0134966 A1 | 5/2016 | Fitzgerald et al. |
| 2018/0122271 A1 | 5/2018 | Ghosh et al. |
| 2018/0145951 A1 | 5/2018 | Varadarajan et al. |
| 2019/0289393 A1 | 9/2019 | Amarilio et al. |
| 2019/0335287 A1 | 10/2019 | Jung et al. |
| 2020/0027451 A1 | 1/2020 | Cantu |
| 2021/0011556 A1 | 1/2021 | Atlas et al. |
| 2021/0089366 A1 | 3/2021 | Wang et al. |
| 2021/0089475 A1 | 3/2021 | Mathur et al. |

OTHER PUBLICATIONS

Aoki et al., "Specification of Camellia—a 128-bit Block Cipher," NTT and Mitsubishi Electric Corporation, Sep. 26, 2001, 35 pp.

"Announcing the Advanced Encryption Standard (AES)," Federal Information Processing Standards Publication 197, Nov. 26, 2001, 51 pp.

"SMS4 Encryption Algorithm for Wireless Networks," Version 1.03, May 15, 2008, 5 pp. (translated by Diffie et al.).

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Kite, "Understanding PDM Digital Audio," Audio Precision Inc., Jan. 11, 2012, 9 pp.

McGrew et al., "The Galois/Counter Mode of Operation (GCM)," Conference Proceedings, May 31, 2015, 44 pp.

Waterman et al., "The RISC-V Instruction Set Manual, vol. II: Privileged Architecture. Version 1.10 Chapter 7," May 7, 2017, 13 pp.

Response to Office Action dated Mar. 17, 2022, from U.S. Appl. No. 16/726,492, filed May 25, 2022, 10 pp.

Office Action from U.S. Appl. No. 16/726,492, dated Mar. 17, 2022, 6 pp.

Notice of Allowance dated Jun. 13, 2022 for U.S. Appl. No. 16/726,492, filed Dec. 24, 2019, 6 pages.

\* cited by examiner

ARTIFICIAL REALITY SYSTEM WITH INTER-PROCESSOR COMMUNICATION (IPC)

This application is a continuation-in-part of U.S. application Ser. No. 16/726,492, filed Dec. 24, 2019, which claims the benefit of U.S. Provisional Application No. 62/905,095 filed Sep. 24, 2019, the contents of both of which are incorporated herein by reference in their entirety.

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, the disclosure describes techniques for inter-processor communication (IPC) mechanisms that are shared among computer processors. In particular, the application will describe one or more System-on-Chip (SoC) integrated circuits comprising a plurality of processors, a network-on-chip (NoC), and an IPC unit. Each of the processors may use registers of the IPC unit to initiate an interrupt request for a target processor.

In one example, the IPC unit includes an address map comprising a plurality of doorbell registers, each of the doorbell registers corresponding to a different pair of the processors. Sets of doorbell registers may be associated with different target processors and associated with interrupt request (IRQ) lines for the processors. A security processor configures the pair of processors (e.g., source processor and target processor) for each doorbell register, at boot time for instance. To generate an interrupt to a target processor, a source processor sends a memory access request including a hardware identifier (HWID) of the source processor, via the NoC, to write a value (e.g., '1') to the doorbell register that corresponds to the source processor, target processor pair. The IPC unit determines whether the HWID of the source processor included in the memory access request matches the HWID stored in the doorbell register at the memory location specified in the memory access request. If the HWIDs of the source processor and the doorbell register do not match, the IPC unit rejects the memory access request, and an error is returned. The IPC unit may log the error, e.g., to the security processor. If the HWIDs of the source processor and the doorbell register match, the IPC unit writes the value to the doorbell register. Writing the value to the doorbell register triggers an interrupt, e.g., raising an interrupt request (IRQ) input, to the target processor. Once the target processor completes processing of the interrupt request, the target processor sends a second memory access request to write a value (e.g., '0') to the same doorbell register to clear the doorbell register for another interrupt request. In some examples, only the source processor can write a value to the doorbell register for a source processor, target processor pair, and only the target processor can clear the value from that doorbell register.

Additionally or alternatively, an IPC unit may support communication between two or more processors using one or more doorbell first-in first-out (FIFO) memories, in accordance with one or more techniques described in this disclosure. In such examples, the IPC unit may include one or more doorbell registers, wherein each doorbell register is associated with a uniquely assigned source processor (also referred to herein as a "source CPU") and a uniquely assigned target processor (also referred to herein as a "target CPU"). Writing a value to the doorbell register triggers an interrupt, e.g., raising an interrupt request (IRQ) input, to the target CPU. In some examples, a doorbell register may have bits for storing values indicative of different interrupt priority levels. The IPC unit may also include one or more doorbell FIFO memories configured to store data associated with each interrupt. This enables the source CPU to write, in conjunction with writing a value to a doorbell register to trigger a doorbell interrupt to a target CPU, a direct or indirect message to a corresponding doorbell FIFO memory. The target CPU may obtain the message in response to receiving the doorbell interrupt.

The techniques may involve one or more technical advantages or improvements that realize at least one practical application. For example, the doorbell FIFO memory in conjunction with a doorbell interrupt may alleviate at least some direct communication between a source CPU and a target CPU that would otherwise be required. In addition, because the doorbell FIFO memory is local to the doorbell registers, the target CPU in the case of direct messages may avoid accessing remote or external memory to obtain data communicated from a source CPU, but instead can obtain the data from the local doorbell FIFO memory. Thus, the use of a doorbell FIFO memory may significantly reduce latency for simple messages between source and target CPUs. In addition, high and low priority doorbell interrupts may reduce overall power usage in a system because target CPUs are transitioned from a sleep or lower power state to an active state upon receipt of a high priority interrupt but not upon receipt of a low priority interrupt. Because the target CPUs in a system are transitioned from a sleep or lower power state to an active state less often (e.g., not upon receipt of low priority interrupts), overall power savings may be achieved.

In one example, the disclosure is directed to an artificial reality system comprising a plurality of processors; an inter-processor communication (IPC) unit comprising a doorbell register uniquely associated with a source processor of the plurality of processors and a target processor of the plurality of processors; and a doorbell first-in first-out (FIFO) memory, wherein a portion of the doorbell FIFO memory is uniquely allocated to the doorbell register; wherein the IPC unit is configured to: receive, from the source processor, a first memory access request to write a FIFO data entry to the doorbell FIFO memory; receive, from the source processor, a second memory access request to write doorbell data to the doorbell register; generate, in response to writing of the doorbell data to the doorbell register, an interrupt to the target processor; and receive, from the target processor, a third memory access request to read the FIFO data entry from the doorbell FIFO memory.

In another example, the disclosure is directed to a method for inter-processor communication (IPC), the method comprising receiving, from a source processor of an artificial reality system, a first memory access request to write a FIFO data entry to a doorbell FIFO memory; receiving, from the source processor, a second memory access request to write doorbell data to a doorbell register; generating, in response to writing of the doorbell data to the doorbell register, an interrupt to a target processor of the artificial reality system; and receiving, from the target processor, a third memory access request to read the FIFO entry from the doorbell FIFO memory.

In another example, the disclosure is directed to a computer-readable storage medium comprising instructions that, when executed, configure processing circuitry to receive, from a source processor of an artificial reality system, a first memory access request to write a FIFO data entry to a doorbell FIFO memory; receive, from the source processor, a second memory access request to write doorbell data to a doorbell register; generate, in response to writing of the doorbell data to the doorbell register, an interrupt to a target processor of an artificial reality system; and receive, from the target processor, a third memory access request to read the FIFO data entry from the doorbell FIFO memory.

The details of one or more examples of the techniques described herein are set forth in the accompanying drawings and the description below. Other features, objects, and advantages of the techniques described herein will be apparent from the description and drawings, and from the claims.

DETAILED DESCRIPTION

Figure 1A:
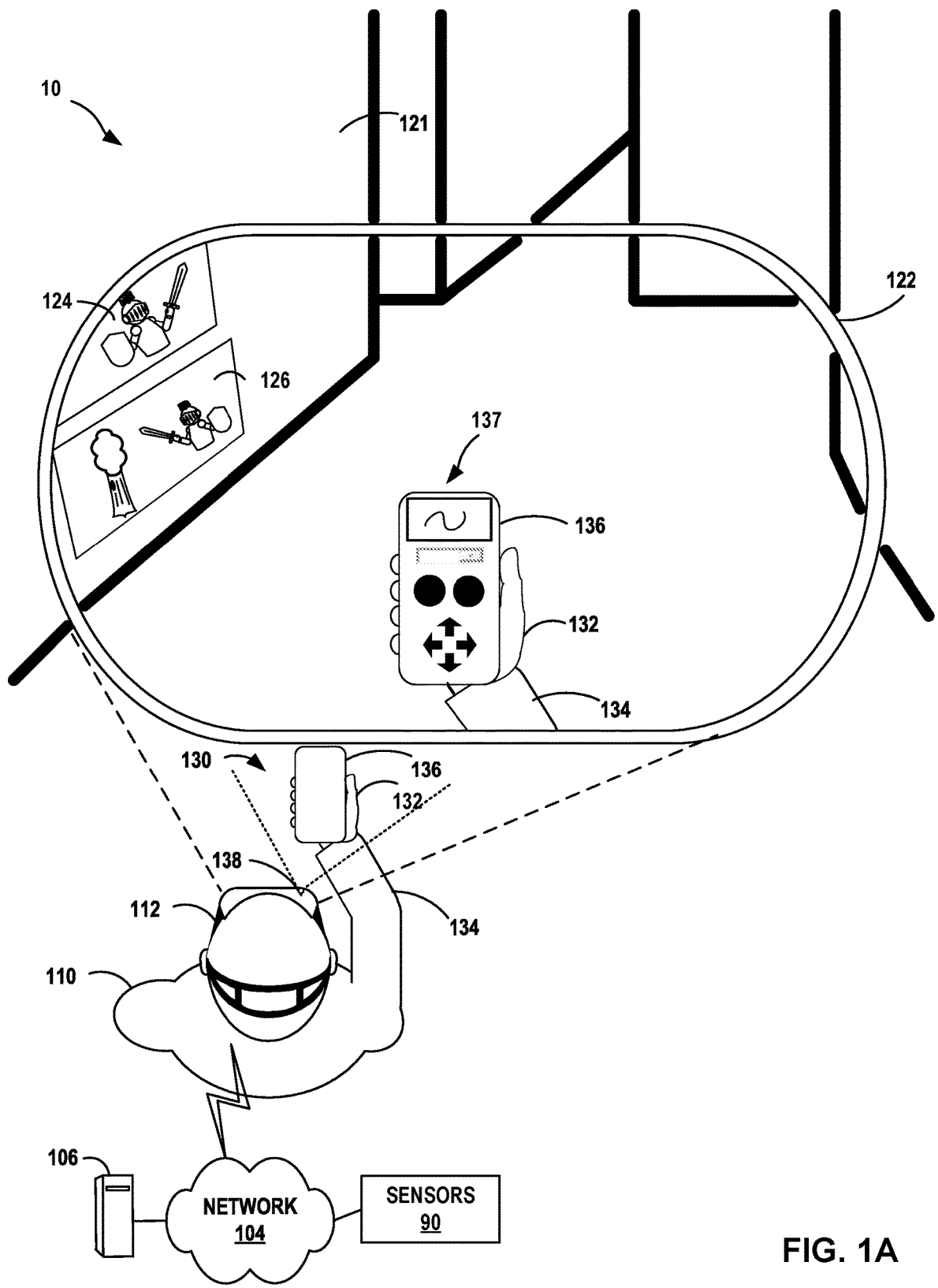
FIG. 1A is an illustration depicting an example artificial reality system that provides inter-processor communication (IPC) mechanisms that are shared among computer processors, in accordance with one or more techniques described in this disclosure.

FIG. 1A is an illustration depicting an example artificial reality system that provides inter-processor communication (IPC) mechanisms that are shared among computer processors, in accordance with one or more techniques described in this disclosure. In the example of FIG. 1A, artificial reality system 10 includes HMD 112, peripheral device 136, and may in some examples include one or more external sensors 90 and/or console 106.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., System on a Chip (SoC)) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface and performs an action that is rendered to HMD 112.

In accordance with one or more techniques of this disclosure, artificial reality system 10 may provide inter-processor communication (IPC) mechanisms that are shared among computer processors of devices, such as peripheral device 136 and/or HMD 112. Although the techniques are described herein with respect to interrupt and IPC mechanisms that are used by computer processors of peripheral device 136 and/or HMD 112 for IPC, the techniques may be used by other hardware components of peripheral device 136 and/or HMD 112, such as for IPC between SoCs or between sub-systems of an SoC (a sub-system may include one or more processors).

In some example implementations, as described herein, peripheral device 136 and HMD 112 may each include one or more SoC integrated circuits configured to support an artificial reality application, such as SoCs operating as co-application processors, sensor aggregators, display controllers, etc. SoCs may comprise a plurality of processors, a network-on-chip (NoC) and an IPC unit. Processors may include computer processing units (CPUs) (e.g., Reduced Instruction Set Computer (RISC), Advanced RISC machines (ARM), Complex Instruction Set Computer (CISC), etc.), digital signal processors (DSPs), convolutional neural network (CNN) processors, or the like. An NoC is a communication infrastructure that enables data communications between components of one or more SoCs. Such components may include sub-systems of an SoC, processors of a sub-system, other processors of an SoC, and the IPC unit.

As further described below, an IPC unit provides IPC mechanisms for one processor of an SoC to notify another processor of the SoC of available communications or that a shared resource is currently in use. In some examples, a processor may store data in one or more memory locations and signal other processors via the NoC that the data is available to process. This signal is referred to as a "doorbell." For example, a source processor may write data to a memory location and "ring the doorbell" by writing to a different memory location, referred to as a doorbell register. By writing to the doorbell register, an interrupt is triggered to one or more target processors to indicate the data is available to process. As described in further detail herein, a device such as HMD 112 and/or peripheral device 136 may include a plurality of doorbell registers, each used to initiate an interrupt request to a uniquely associated one of a plurality of target processors.

Additionally or alternatively, an IPC unit may support communication between two or more processors using one or more doorbell first-in first-out (FIFO) memories, in accordance with one or more techniques described in this disclosure. In such examples, the IPC unit may include one or more doorbell registers, wherein each doorbell register is associated with a uniquely assigned source processor (also referred to herein as a "source CPU") and a uniquely assigned target processor (also referred to herein as a "target CPU"). Writing a value to the doorbell register triggers an interrupt, e.g., raises an interrupt request (IRQ) input, to the target CPU. In some examples, a doorbell register may include bits for storing values indicative of different interrupt priority levels. The IPC unit may also include one or more doorbell FIFO memories configured to store data associated with each interrupt. This enables the source CPU to write, in conjunction with writing a value to a doorbell register to trigger a doorbell interrupt to a target CPU, a direct or indirect message to a corresponding doorbell FIFO memory. The target CPU may obtain the message in response to receiving the doorbell interrupt.

The techniques may involve one or more technical advantages or improvements that realize at least one practical application. For example, a doorbell FIFO memory in conjunction with a doorbell interrupt may alleviate at least some direct communication between a source CPU and a target CPU that would otherwise be required. In addition, because the doorbell FIFO memory is local to the doorbell registers, the target CPU in the case of direct messages may avoid accessing remote or external memory to obtain data communicated from a source CPU, but instead can obtain the data from the local doorbell FIFO memory. Thus, the use of a doorbell FIFO memory may significantly reduce latency for simple messages between source and target CPUs. In addition, high and low priority doorbell interrupts may reduce overall power usage in a system because target CPUs are transitioned from a sleep or lower power state to an active state upon receipt of a high priority interrupt but not upon receipt of a low priority interrupt. Because the target CPUs in a system are transitioned from a sleep or lower power state to an active state less often (e.g., not upon receipt of low priority interrupts), overall power savings may be achieved.

In some examples, a processor may request access to a shared resource (e.g., memory, I/O devices) and, upon acquiring ownership of the shared resource, prevent simultaneous access to the shared resource by other processors. This is referred to as "mutual exclusion" or "mutex" where a processor may acquire ownership of a mutex corresponding to the shared resource. For example, a first processor (e.g., central processing unit (CPU)) and a second processor (e.g., graphics processor unit (GPU)) of peripheral device 136 may share memory, and only the processor with the ownership of the mutex may access to the shared memory. As described in further detail herein, a device such as HMD 112 and/or peripheral device 136 may include a plurality of hardware mutual execution registers ("mutex registers"), each used to prevent simultaneous access to a shared resource. A processor executing on the device may attempt to acquire a mutex by attempting to write, to a mutex register for a shared resource, a unique hardware identifier for the processor (HWID) and a software identifier for a process (SWID). If the acquisition succeeds, the mutex register stores the HWID and SWID. Based on this state of the mutex register, the processor and other processors of the device can determine ownership of the mutex and in this way control access to the corresponding shared resource.

Figure 1B:
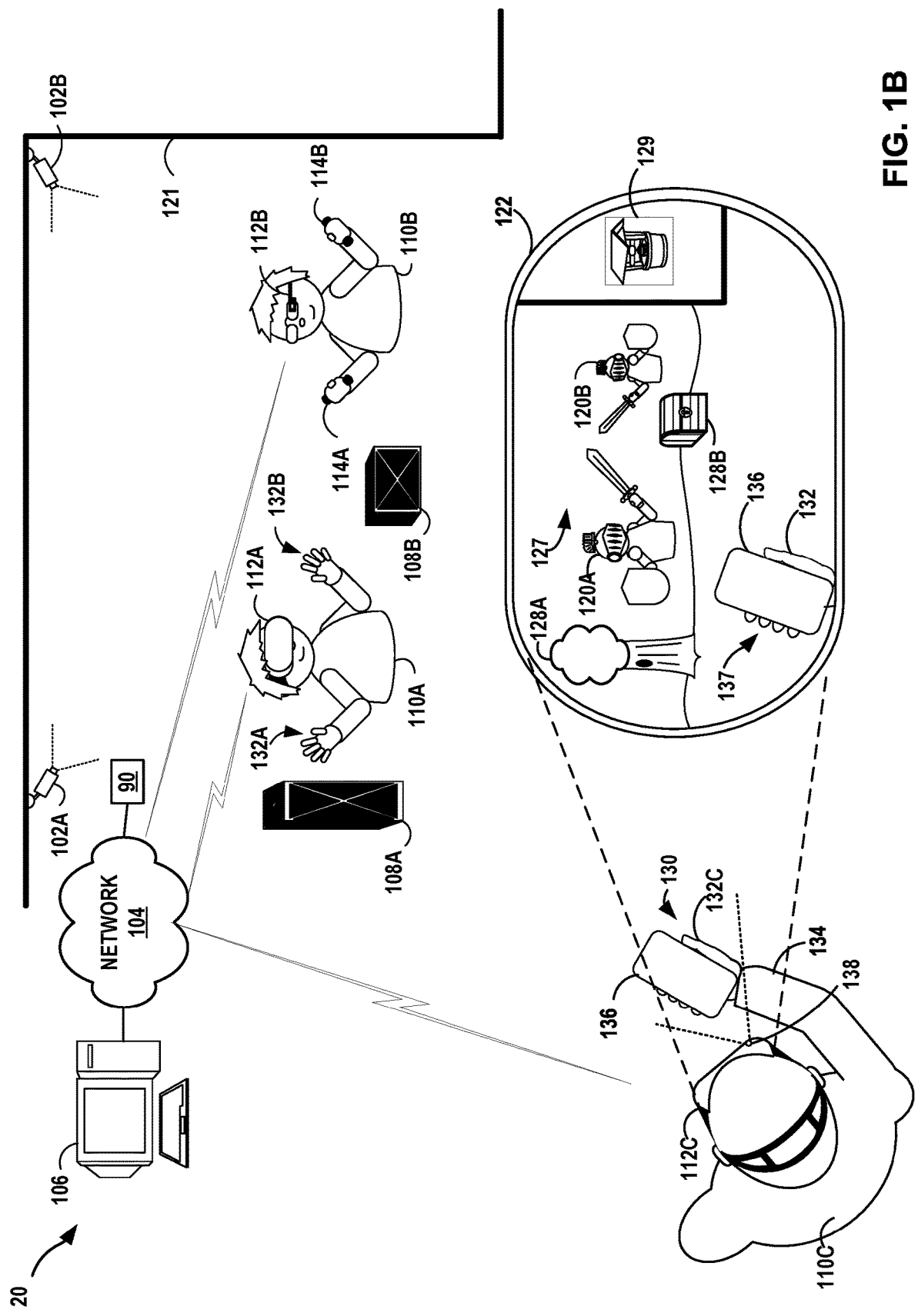
FIG. 1B is an illustration depicting another example artificial reality system that provides inter-processor communication mechanisms that are shared among computer processors, in accordance with techniques described in this disclosure.

FIG. 1B is an illustration depicting another example artificial reality system 20 that provides interrupt and interprocessor communication mechanisms that are shared among computer processors, in accordance with one or more techniques described in this disclosure. In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real-world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand. In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render artificial reality content. Artificial reality content may include virtual content items and/or UI elements, responsive to such gestures, motions, and orientations, such as that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and/or controllers 114 may each include one or more SoC integrated circuits configured to enable an operating environment for artificial reality applications.

Similar to the example described in FIG. 1A, IPC unit of SoCs may enable processors to perform inter-processor communication, such as for doorbells and/or mutexes. As described in further detail below, the IPC unit provides IPC mechanisms for one processor of an SoC to notify another processor of the SoC of available communications (e.g., doorbell). For instance, a device such as HMDs 112 and/or peripheral device 136 may include a plurality of doorbell registers, each configured with a pair of processors (e.g., source processor and target processor). Each of the doorbell registers may be used to initiate an interrupt request to a target processor. In some examples, a processor may request access to a shared resource (e.g., memory, I/O devices) and, upon acquiring ownership of the shared resource, prevent simultaneous access to the shared resource by other processors (e.g., mutex). For example, a device such as HMDs 112 and/or peripheral device 136 may include a plurality of mutex registers, each used to prevent simultaneous access to a shared resource. Based on the state of the mutex register, the processor and other processors of the device can determine ownership of the mutex and in this way control access to the corresponding shared resource.

Additionally or alternatively, an IPC unit may support communication between two or more processors using one or more doorbell first-in first-out (FIFO) memories, in accordance with one or more techniques described in this disclosure. In such examples, the IPC unit may include one or more doorbell registers, wherein each doorbell register is associated with a uniquely assigned source processor (also referred to herein as a "source CPU") and a uniquely assigned target processor (also referred to herein as a "target CPU"). Writing a value to the doorbell register triggers an interrupt, e.g., raising an interrupt request (IRQ) input, to the target CPU. In some examples, a doorbell register may have bits for storing values indicative of different interrupt priority levels. The IPC unit may also include one or more doorbell FIFO memories configured to store data associated with each interrupt. This enables the source CPU to write, in conjunction with writing a value to a doorbell register to trigger a doorbell interrupt to a target CPU, a direct or indirect message to a corresponding doorbell FIFO memory. The target CPU may obtain the message in response to receiving the doorbell interrupt.

The techniques may involve one or more technical advantages or improvements that realize at least one practical application. For example, a doorbell FIFO memory in conjunction with a doorbell interrupt may alleviate at least some direct communication between a source CPU and a target CPU that would otherwise be required. In addition, because the doorbell FIFO memory is local to the doorbell registers, the target CPU in the case of direct messages may avoid accessing remote or external memory to obtain data communicated from a source CPU, but instead can obtain the data from the local doorbell FIFO memory. Thus, the use of a doorbell FIFO memory may significantly reduce latency for simple messages between source and target CPUs. In addition, high and low priority doorbell interrupts may reduce overall power usage in a system because target CPUs are transitioned from a sleep or lower power state to an active state upon receipt of a high priority interrupt but not upon receipt of a low priority interrupt. Because the target CPUs in a system are transitioned from a sleep or lower power state to an active state less often (e.g., not upon receipt of low priority interrupts), overall power savings may be achieved.

Figure 2A:
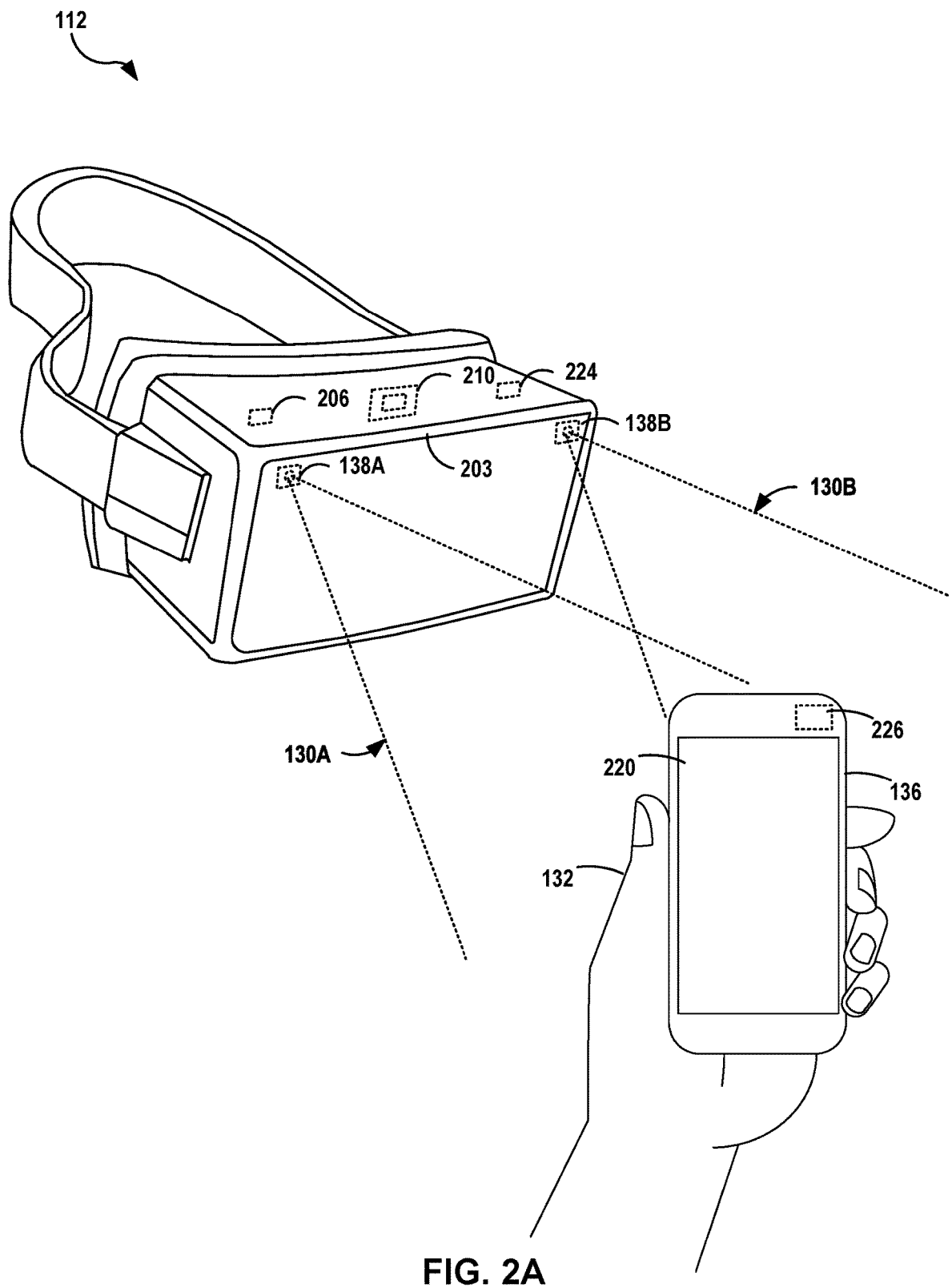
FIG. 2A is an illustration depicting an example HMD that provides inter-processor communication mechanisms that are shared among computer processors, in accordance with techniques described in this disclosure.

FIG. 2A is an illustration depicting an example HMD 112 and an example peripheral device 136 that provides interrupt and inter-processor communication mechanisms that are shared among computer processors, in accordance with techniques described in this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with one or more techniques described herein, HMD 112 includes an IPC unit 224 that provides inter-processor communication mechanisms that are shared among computer processors. Similarly, peripheral device 136 includes an IPC unit 226 that provides inter-processor communication mechanisms that are shared among computer processors.

IPC units 224 and 226 may each implement doorbells and/or mutexes to enable processors to perform inter-processor communication. Similar to the examples described in FIGS. 1A and 1B, IPC units 224 and 226 may each provide IPC mechanisms for one processor of an SoC to notify another processor of the SoC of available communications (e.g., doorbell). For instance, HMD 112 may include a plurality of doorbell registers, each configured with a pair of processors (e.g., source processor and target processor of HMD 112). IPC unit 224 of HMD 112 may use the doorbell registers to initiate an interrupt request to a target processor of HMD 112. Similarly, peripheral device 136 may include a plurality of doorbell registers, each configured with a pair of processors. IPC unit 226 of peripheral device 136 may use the doorbell registers to initiate an interrupt request to a target processor of peripheral device 136.

Additionally or alternatively, an IPC unit 224 of FIG. 2A may support communication between two or more processors using one or more doorbell first-in first-out (FIFO) memories, in accordance with one or more techniques described in this disclosure. In such examples, the IPC unit may include one or more doorbell registers, wherein each doorbell register is associated with a uniquely assigned source processor (also referred to herein as a "source CPU") and a uniquely assigned target processor (also referred to herein as a "target CPU"). Writing a value to the doorbell register triggers an interrupt, e.g., raising an interrupt request (IRQ) input, to the target CPU. In some examples, a doorbell register may have bits for storing values indicative of different interrupt priority levels. The IPC unit may also include one or more doorbell FIFO memories configured to store data associated with each interrupt. This enables the source CPU to write, in conjunction with writing a value to a doorbell register to trigger a doorbell interrupt to a target CPU, a direct or indirect message to a corresponding doorbell FIFO memory. The target CPU may obtain the message in response to receiving the doorbell interrupt.

The techniques may involve one or more technical advantages or improvements that realize at least one practical application. For example, a doorbell FIFO memory in conjunction with a doorbell interrupt may alleviate at least some direct communication between a source CPU and a target CPU that would otherwise be required. In addition, because the doorbell FIFO memory is local to the doorbell registers, the target CPU in the case of direct messages may avoid accessing remote or external memory to obtain data communicated from a source CPU, but instead can obtain the data from the local doorbell FIFO memory. Thus, the use of a doorbell FIFO memory may significantly reduce latency for simple messages between source and target CPUs. In addition, high and low priority doorbell interrupts may reduce overall power usage in a system because target CPUs are transitioned from a sleep or lower power state to an active state upon receipt of a high priority interrupt but not upon receipt of a low priority interrupt. Because the target CPUs in a system are transitioned from a sleep or lower power state to an active state less often (e.g., not upon receipt of low priority interrupts), overall power savings may be achieved.

In some examples, a processor may request mutually exclusive access to a shared resource (e.g., mutex). In the example of FIG. 2A, processors of HMD 112 and/or peripheral device 136 may each try to access a resource at different times or coincidentally. For example, the memory of peripheral device 136 may store data captured by HMD 112 and/or peripheral device 136. In this example, a processor of HMD 112 may request mutually exclusive access to the shared memory in peripheral device 136. As described above and further below, HMD 112 may include a plurality of mutex registers, each used to prevent simultaneous access to a shared resource. To use a shared resource such as the memory in HMD 112, a first process running on a first processor of HMD 112 must acquire ownership of a mutex of a mutex register corresponding to that resource. Based on the state of the mutex register, the processor and other processors of HMD 112 can determine ownership of the mutex and in this way control access to the corresponding shared resource.

Figure 2B:
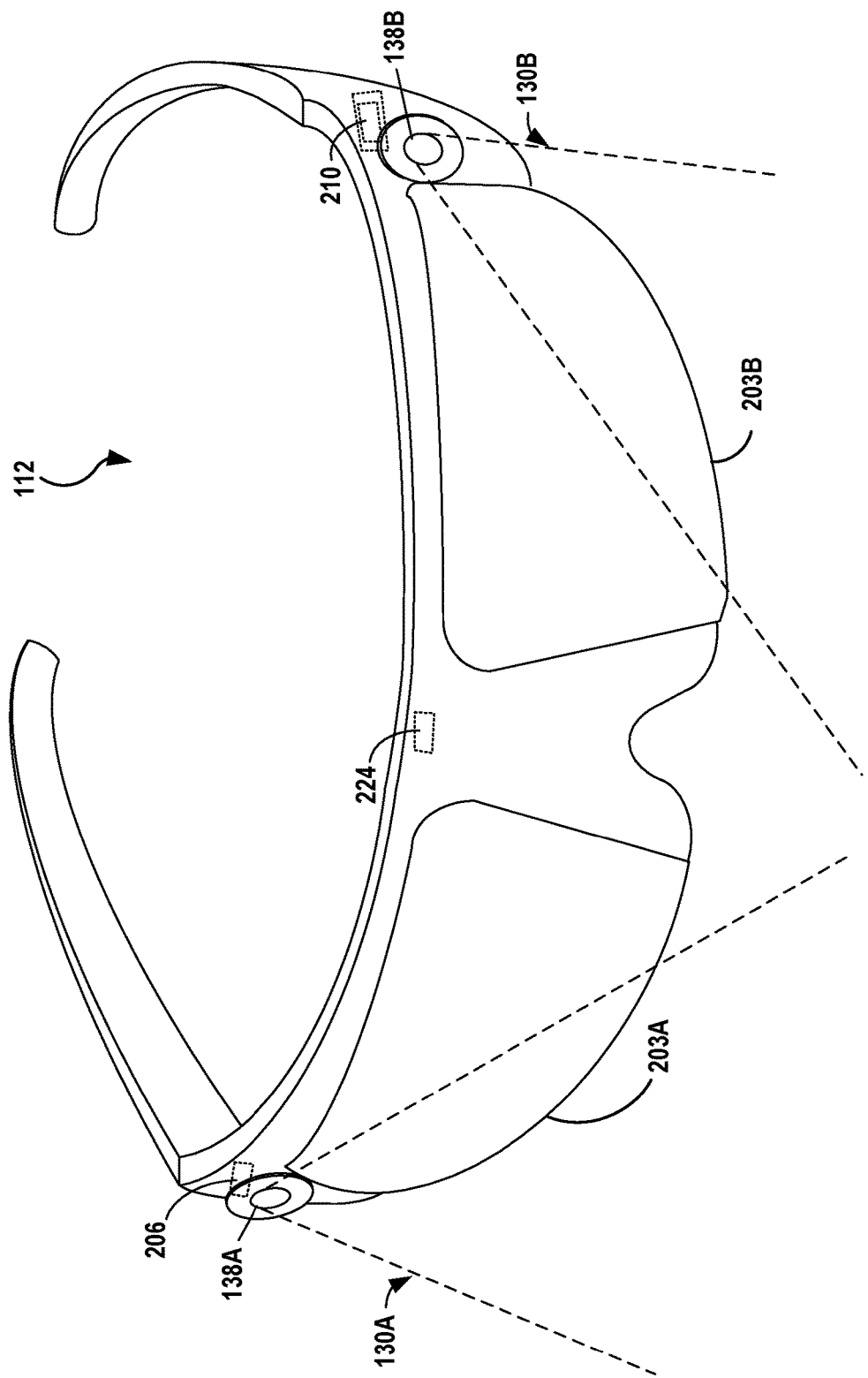
FIG. 2B is an illustration depicting another example HMD that provides inter-processor communication mechanisms that are shared among computer processors, in accordance with techniques described in this disclosure.

FIG. 2B is an illustration depicting another example HMD 112, in accordance with techniques described in this disclosure. FIG. 2B illustrates an HMD 112 having a glasses form factor. HMD 112 of FIG. 2B may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein. HMD 112 of FIG. 2B may communicate with a peripheral device (not shown in FIG. 2B).

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Similar to the example illustrated in FIG. 2A, HMD 112 includes an IPC unit 224 that provides inter-processor communication mechanisms that are shared among computer processors. IPC unit 224 enables processors of HMD 112 may implement doorbells and/or mutexes to enable processors to perform inter-processor communication. Similar to the example described in FIG. 2A, IPC unit 224 may each provide IPC mechanisms for one processor of an SoC to notify another processor of the SoC of available communications (e.g., doorbell). For instance, HMD 112 may include a plurality of doorbell registers, each configured with a pair of processors (e.g., source processor and target processor of HMD 112). IPC unit 224 of HMD 112 may use the doorbell registers to initiate an interrupt request to a target processor of HMD 112.

Additionally or alternatively, an IPC unit 224 of FIG. 2B may support communication between two or more processors using one or more doorbell first-in first-out (FIFO) memories, in accordance with one or more techniques described in this disclosure. In such examples, the IPC unit may include one or more doorbell registers, wherein each doorbell register is associated with a uniquely assigned source processor (also referred to herein as a "source CPU") and a uniquely assigned target processor (also referred to herein as a "target CPU"). Writing a value to the doorbell register triggers an interrupt, e.g., raising an interrupt request (IRQ) input, to the target CPU. In some examples, a doorbell register may have bits for storing values indicative of different interrupt priority levels. The IPC unit may also include one or more doorbell FIFO memories configured to store data associated with each interrupt. This enables the source CPU to write, in conjunction with writing a value to a doorbell register to trigger a doorbell interrupt to a target CPU, a direct or indirect message to a corresponding doorbell FIFO memory. The target CPU may obtain the message in response to receiving the doorbell interrupt.

The techniques may involve one or more technical advantages or improvements that realize at least one practical application. For example, a doorbell FIFO memory in conjunction with a doorbell interrupt may alleviate at least some direct communication between a source CPU and a target CPU that would otherwise be required. In addition, because the doorbell FIFO memory is local to the doorbell registers, the target CPU in the case of direct messages may avoid accessing remote or external memory to obtain data communicated from a source CPU, but instead can obtain the data from the local doorbell FIFO memory. Thus, the use of a doorbell FIFO memory may significantly reduce latency for simple messages between source and target CPUs. In addition, high and low priority doorbell interrupts may reduce overall power usage in a system because target CPUs are transitioned from a sleep or lower power state to an active state upon receipt of a high priority interrupt but not upon receipt of a low priority interrupt. Because the target CPUs in a system are transitioned from a sleep or lower power state to an active state less often (e.g., not upon receipt of low priority interrupts), overall power savings may be achieved.

In some examples, a processor may request mutually exclusive access to a shared resource (e.g., mutex). In the example of FIG. 2B, processors of HMD 112 may each try to access a shared resource (e.g., of HMD 112 or a peripheral device 136). For example, the memory of HMD 112 may store data captured by HMD 112 and/or other devices. In this example, a processor of HMD 112 may request mutually exclusive access to the shared memory. As described above and further below, to use a shared resource, HMD 112 may include a plurality of mutex registers, each used to prevent simultaneous access to a shared resource. To use a shared resource such as the memory in HMD 112, a first process running on a first processor of HMD 112 must acquire ownership of a mutex of a mutex register corresponding to that resource. Based on the state of the mutex register, the processor and other processors of HMD 112 can determine ownership of the mutex and in this way control access to the corresponding shared resource.

Figure 3:
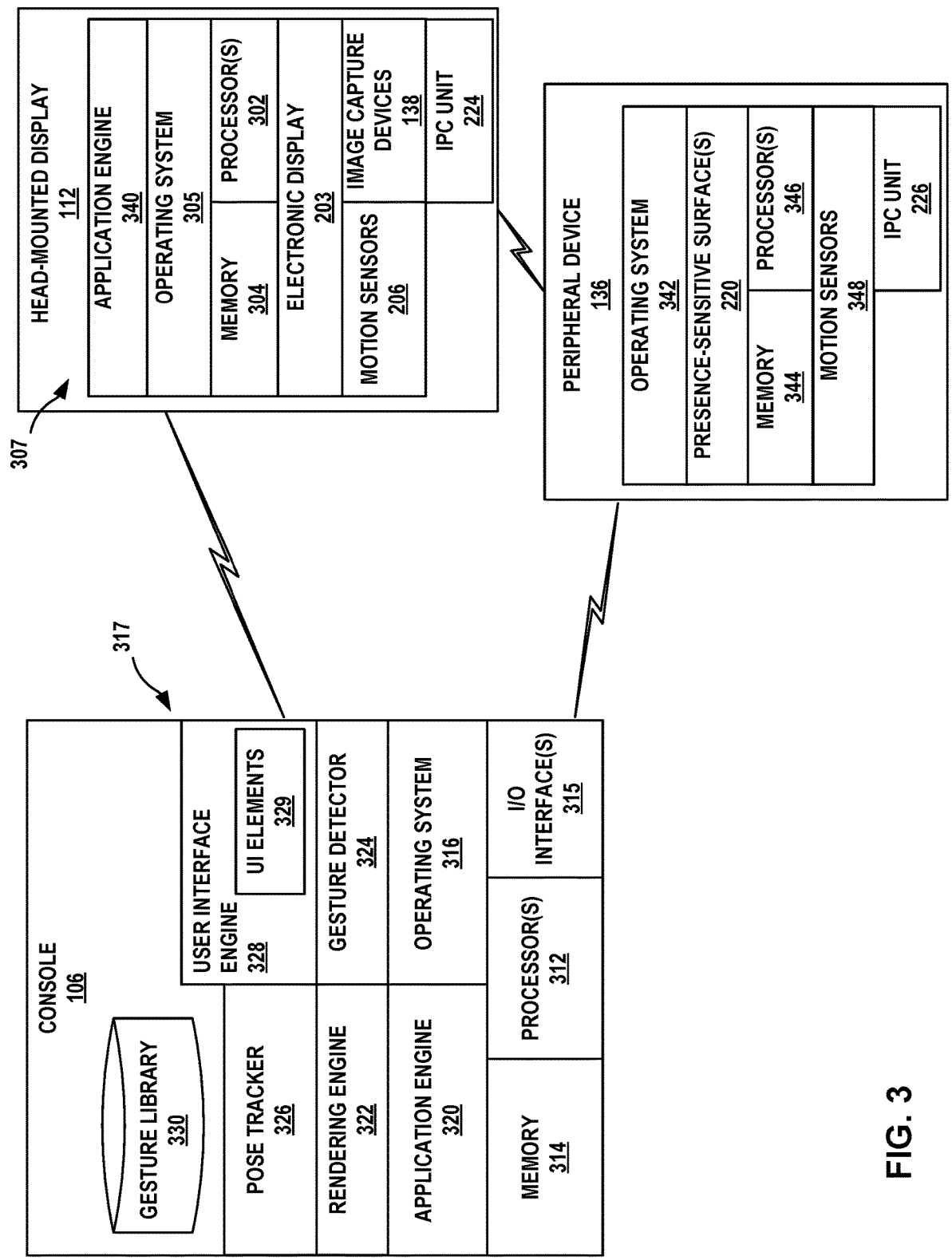
FIG. 3 is a block diagram showing example implementations of a console, an HMD, and a peripheral device of the multi-device artificial reality systems of FIGS. 1A, 1B, in accordance with techniques described in this disclosure.

FIG. 3 is a block diagram showing example implementations of console 106, HMD 112, and peripheral device 136 of multi-device artificial reality system 10, 20 of FIGS. 1A, 1B, in accordance with techniques described in this disclosure. In the example of FIG. 3, console 106 performs pose tracking, gesture detection, and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit. As discussed with respect to the example of FIGS. 2A and 2B, processors 302 include a security processor 224 to provide secure device attestation and mutual authentication of HMD 112 when pairing with devices, e.g., peripheral device 136, used in conjunction within the AR environment. Each of software components 307 and processes executed by HMD 112 may have a different software identifier. Processes executed by processors of peripheral device 136 may also have different software identifiers. Software identifiers for processes may be unique among processes executed by any device of the artificial reality system 10.

In general, console 106 is a computing device that processes image and tracking information received from cameras 102 (FIG. 1B) and/or image capture devices 138 HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine. Each of software applications 317 and other processes executed by console 106 may have a different software identifier.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for peripheral device 136 and/or HMD 112. User interface engine 328 is configured to generate virtual user interfaces for rendering at HMD 112 in an artificial reality environment. User interface engine 328 may generate a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render virtual user interface and other artificial reality content for display at HMD 112 in the artificial reality environment.

Console 106 may output artificial reality content, via a communication channel, to HMD 112 for display at HMD 112. Rendering engine 322 may receive pose information for HMD 112 and/or peripheral device 136 to update the pose rendering of artificial reality content to the pose.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 may process the user inputs to detect one or more gestures of gesture library 330.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Some entries in gesture library 330 may each define a gesture as one or more user inputs, over time, detected by presence-sensitive surface(s) 220 of peripheral device 136. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The user interface engine 328 can define the menu that is displayed and can control actions that are performed in response to selections caused by selection gestures.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In accordance with one or more techniques described herein, the multi-device artificial reality system of FIG. 3 provides inter-processor communication mechanisms that are shared among processors. For example, as discussed in greater detail herein, peripheral device 136 may include IPC unit 226 to provide inter-processor communication mechanisms, such as doorbell(s) and/or mutex(es), for processors of peripheral device 136 and processors of other devices of the AR system, e.g., HMD 112 and/or console 106, used in conjunction within the AR environment. Similarly, IPC unit 224 of HMD 112 may provide inter-processor communication mechanisms, such as doorbell(s) and/or mutex(es), for processors of HMD 112 and processors of other devices of the AR system, e.g., peripheral device 136 and/or console 106, used in conjunction within the AR environment.

Additionally or alternatively, IPC units 224, 226 such as shown in FIG. 3 may support communication between two or more processors using one or more doorbell first-in first-out (FIFO) memories, in accordance with one or more techniques described in this disclosure. In such examples, the IPC unit may include one or more doorbell registers, wherein each doorbell register is associated with a uniquely assigned source processor (also referred to herein as a "source CPU") and a uniquely assigned target processor (also referred to herein as a "target CPU"). Writing a value to the doorbell register triggers an interrupt, e.g., raising an interrupt request (IRQ) input, to the target CPU. In some examples, a doorbell register may have bits for storing values indicative of different interrupt priority levels. The IPC unit may also include one or more doorbell FIFO memories configured to store data associated with each interrupt. This enables the source CPU to write, in conjunction with writing a value to a doorbell register to trigger a doorbell interrupt to a target CPU, a direct or indirect message to a corresponding doorbell FIFO memory. The target CPU may obtain the message in response to receiving the doorbell interrupt.

The techniques may involve one or more technical advantages or improvements that realize at least one practical application. For example, a doorbell FIFO memory in conjunction with a doorbell interrupt may alleviate at least some direct communication between a source CPU and a target CPU that would otherwise be required. In addition, because the doorbell FIFO memory is local to the doorbell registers, the target CPU in the case of direct messages may avoid accessing remote or external memory to obtain data communicated from a source CPU, but instead can obtain the data from the local doorbell FIFO memory. Thus, the use of a doorbell FIFO memory may significantly reduce latency for simple messages between source and target CPUs. In addition, high and low priority doorbell interrupts may reduce overall power usage in a system because target CPUs are transitioned from a sleep or lower power state to an active state upon receipt of a high priority interrupt but not upon receipt of a low priority interrupt. Because the target CPUs in a system are transitioned from a sleep or lower power state to an active state less often (e.g., not upon receipt of low priority interrupts), overall power savings may be achieved.

Figure 4:
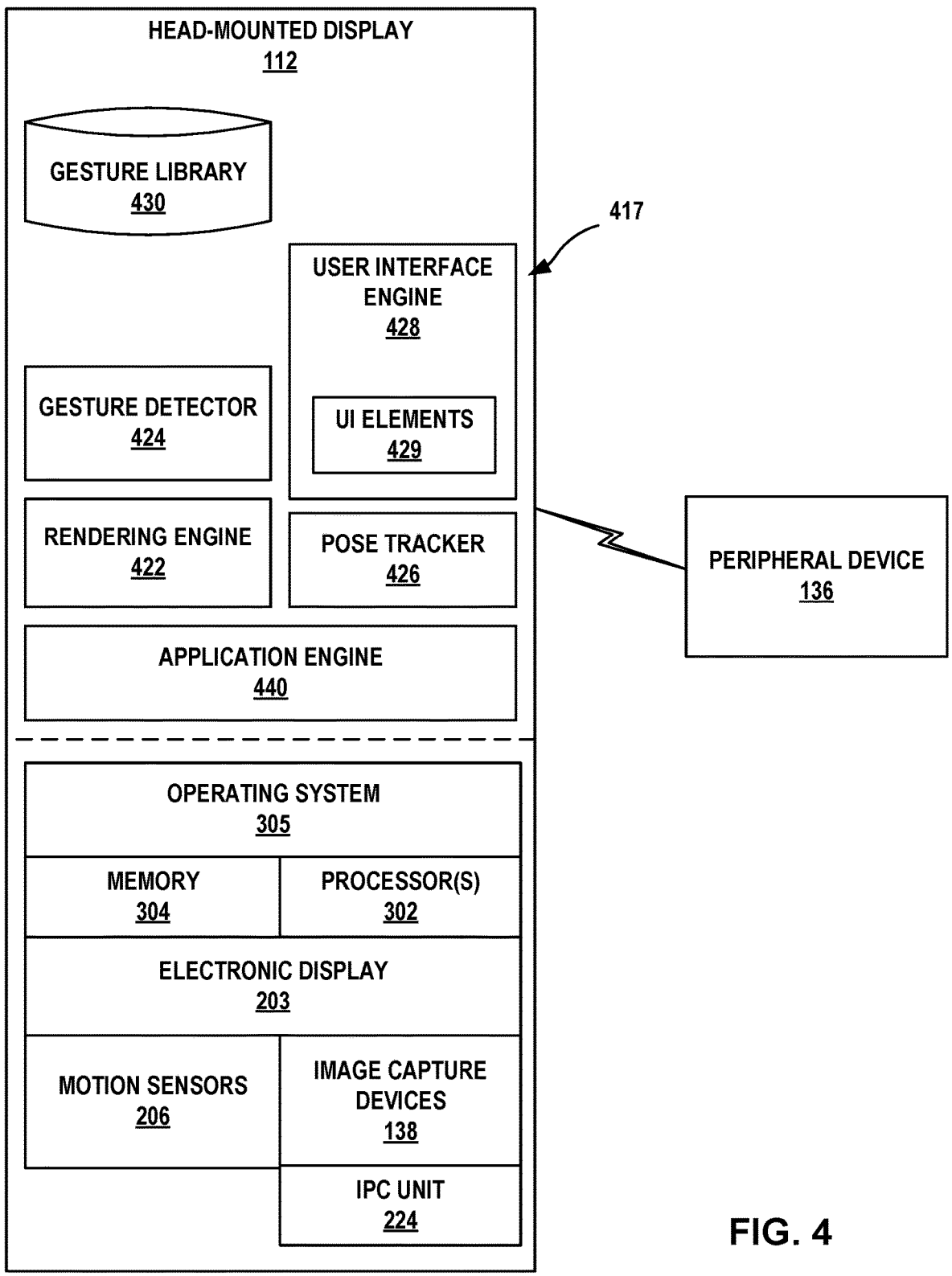
FIG. 4 is a block diagram showing an example implementation of an HMD, and a peripheral device of the artificial reality systems of FIGS. 1A, 1B, in accordance with one or more techniques described in this disclosure.

FIG. 4 is a block diagram of an example implementation of an HMD 112, and a peripheral device 136 of the artificial reality systems of FIGS. 1A, 1B, in accordance with one or more techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110.

More specifically, gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136. Gesture library 430 is similar to gesture library 330 of FIG. 3. Some of all of the functionality of gesture detector 424 may be executed by peripheral device 136.

Similar to the example described with respect to FIG. 3, HMD 112 includes an inter-processor communication (IPC) unit 224 that provides inter-processor communication (e.g., via doorbells and/or mutexes) between processors 302 of HMD 112 or to processors of other devices (e.g., peripheral device 136) of the AR system.

Additionally or alternatively, an IPC unit 224 as shown in FIG. 4 may support communication between two or more processors using one or more doorbell first-in first-out (FIFO) memories, in accordance with one or more techniques described in this disclosure. In such examples, the IPC unit may include one or more doorbell registers, wherein each doorbell register is associated with a uniquely assigned source processor (also referred to herein as a "source CPU") and a uniquely assigned target processor (also referred to herein as a "target CPU"). Writing a value to the doorbell register triggers an interrupt, e.g., raising an interrupt request (IRQ) input, to the target CPU. In some examples, a doorbell register may have bits for storing values indicative of different interrupt priority levels. The IPC unit may also include one or more doorbell FIFO memories configured to store data associated with each interrupt. This enables the source CPU to write, in conjunction with writing a value to a doorbell register to trigger a doorbell interrupt to a target CPU, a direct or indirect message to a corresponding doorbell FIFO memory. The target CPU may obtain the message in response to receiving the doorbell interrupt.

The techniques may involve one or more technical advantages or improvements that realize at least one practical application. For example, a doorbell FIFO memory in conjunction with a doorbell interrupt may alleviate at least some direct communication between a source CPU and a target CPU that would otherwise be required. In addition, because the doorbell FIFO memory is local to the doorbell registers, the target CPU in the case of direct messages may avoid accessing remote or external memory to obtain data communicated from a source CPU, but instead can obtain the data from the local doorbell FIFO memory. Thus, the use of a doorbell FIFO memory may significantly reduce latency for simple messages between source and target CPUs. In addition, high and low priority doorbell interrupts may reduce overall power usage in a system because target CPUs are transitioned from a sleep or lower power state to an active state upon receipt of a high priority interrupt but not upon receipt of a low priority interrupt. Because the target CPUs in a system are transitioned from a sleep or lower power state to an active state less often (e.g., not upon receipt of low priority interrupts), overall power savings may be achieved.

Figure 5A:
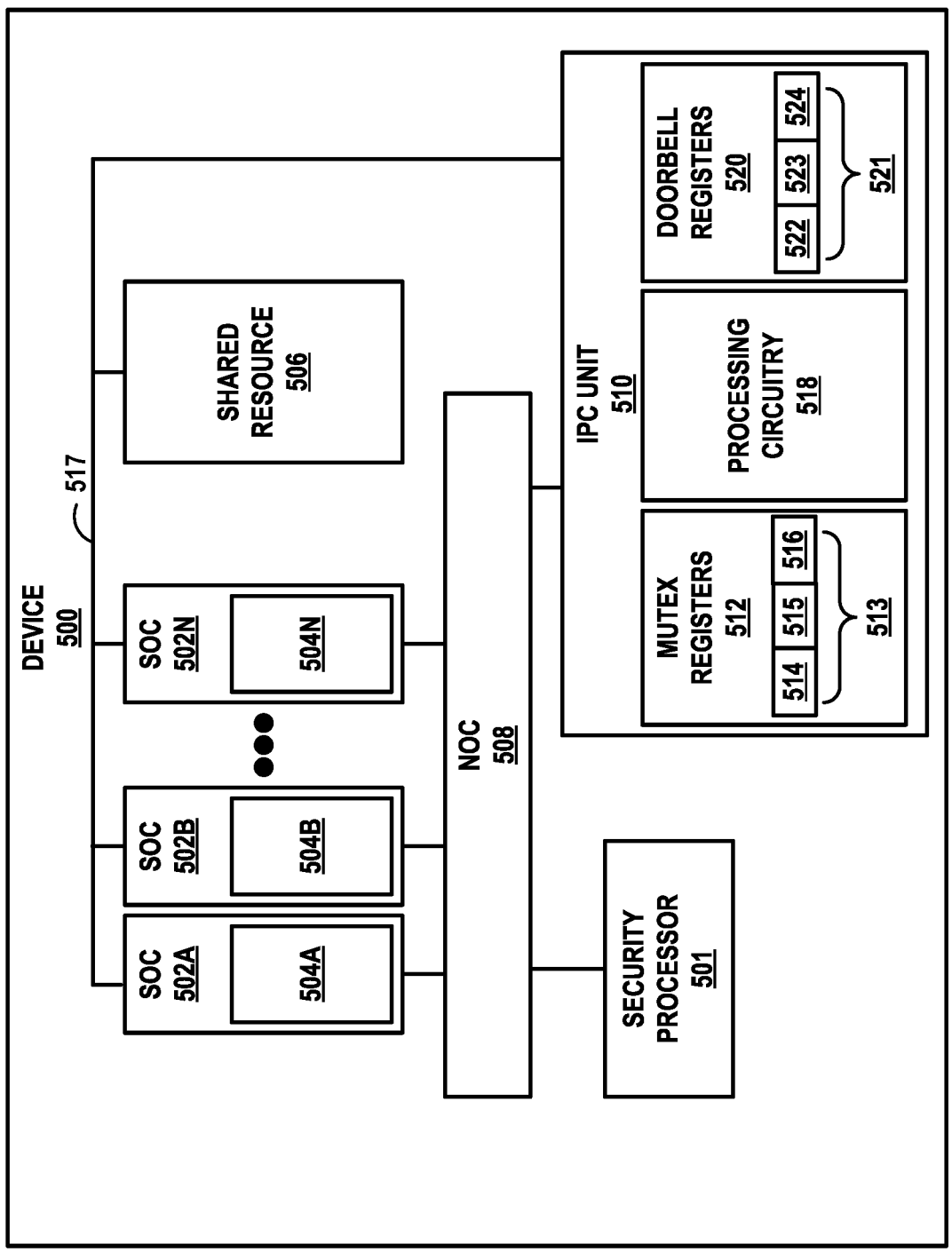
FIG. 5A is a block diagram showing an example implementation in which multiple computer processors of SoCs use inter-processor communication, in accordance with one or more techniques described in this disclosure.

FIG. 5A is a block diagram showing an example implementation of a device 500 of an artificial reality system. Device 500 may be an example of HMDs 112 or peripheral device 136 of FIGS. 1A-4, or any device in the artificial reality system. Device 500 may be part of an artificial reality system, such as artificial reality systems 10, 20 of FIGS. 1A, 1B, or may operate as a stand-alone, mobile artificial reality system configured to implement the techniques described herein.

In this example, device 500 includes one or more systems-on-chip (SoCs) integrated circuits 502A-502N (collectively, "SoCs 502"), memory 506, network-on-chip (NoC) 508, and inter-processor communication (IPC) unit 510. In general, SoCs 502 represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components. Each of the functional blocks may be referred to as a subsystem or component of the SoC. Some example SoCs are shown in FIG. 5C. Each SoC 502 as shown in FIG. 5A may include one or more processors. In the example of FIG. 5A, SoCs 502 include respective processors 504A-504N (collectively, "processors 504"). Processors 504 may include central processing units CPUs, DSPs, CNN processors, GPUs, or other processing circuitry for executing instructions. Processors 504 and other components of SoCs 502 may communicate with one another using NoC 508. NoC 508 is a communication infrastructure comprising, e.g., shared busses between components of SoCs 502.

In this example, IPC unit 510 includes mutex registers 512, processing circuitry 518, and doorbell registers 520. SoCs 502 and security processor 501 operate in conjunction with IPC unit 510 to provide inter-processor communication, such as doorbell(s) and/or mutex(es). Although IPC unit 510 is illustrated as including both mutex registers 512 and doorbell registers 520, IPC unit 510 may include only mutex registers 512, only doorbell registers 520, or both.

Doorbell registers 520 may represent a logical or physical writable register of a memory address map (e.g., 32-bit). Doorbell registers 520 include a plurality of doorbell slices 521. Although FIG. 5A shows a single doorbell slice 521 corresponding to a single source processor of processors 504 and a single target processor of processors 504, it shall be understood that doorbell registers 520 include a plurality of doorbell slices 521, each corresponding to a different source processor/target processor pair. Each doorbell slice 521 includes a source ID register 522, a target ID register 523, and a function doorbell register 524. Sets of doorbell registers may be associated with different target processors and tied to interrupt request lines 517 for the processors. Security processor 501 may configure the pair of source/target processors for each doorbell register slice 521 of doorbell registers 520, at boot time for instance. For example, security processor 501 may configure the source ID stored in source ID register 522, the target ID stored in target ID register 523 of each doorbell slice 521.

In some examples, a group of doorbell slices 521 from each possible source processor is tied to a single target processor (e.g., one-to-one mapping), where interrupt request lines 517 connect the source processor to the single target processor. In some examples, doorbell registers 520 may include multiple doorbell register groups (e.g., one-to-many mapping). The source processor, target processor pair of registers may be referred to as "security registers." For example, a single target processor may be mapped to a plurality of source processors for a doorbell register group, wherein the doorbell registers in the same group are tied a single target processor (e.g., output IRQs connected to interrupt controller inputs of target processor). An example of security registers for a doorbell register group is shown below:

| Security Register Address Offset | Register Name | Register width (bit) | Comment |
|---|---|---|---|
| 0x0000 | ERR_STATUS | 32 | Error log: status |
| 0x0004 | ERR_DATA | 32 | Error log: data |
| 0x0020 | TGT_ROLEID | 8 | Role ID of target CPU is shared by all doorbell registers in the same group |
| 0x0004 | SRC_ROLEID #0 | 8 | Role ID of source CPU for doorbells #0, #1, and so on. Upper 24-bit is reserved |
| 0x0008 | SRC_ROLEID #1 | 8 | |
| . . . | . . . | | |

For ease of illustration, only a single doorbell register group 521 is illustrated in FIG. 5A. IPC unit 510 provides inter-processor communication mechanisms for processors 504 of SoCs 502. For example, any of source processors 504 of SoCs 502 may use IPC unit 510 to generate an interrupt (e.g., doorbell) for any of target processors 504. As one example, security processor 501 configures a doorbell register slice 521 of doorbell registers 520 with a source ID register 522, target ID register 523 pair. In this example, security processor 501 configures doorbell register group 521 with a source processor register, target processor register pair (e.g., security register). For example, security processor 501 configures the security register of doorbell register group 521 with source processor register 522 specified as an HWID of processor 504A and target processor register 523 specified as an HWID of processor 504B. In some examples, other source processors are associated with target processor 523 and may be part of the doorbell register group.

Each doorbell register group is associated with a 1-bit function doorbell register 524 that is a writable register having a memory-mapped address. The 1-bit function register may have output IRQ lines connected to target CPU's interrupt controller inputs. An example of the function register is shown below:

| Function Register Address Offset | Register Name | Register width (bit) | Comment |
|---|---|---|---|
| 0x1000 | DOORBELL #0 | 1 | Doorbell register |
| 0x1008 | DOORBELL #1 | 1 | |
| . . . | | | |

For example, to generate an interrupt from source processor 504A to target processor 504B, source processor 504A sends a memory request, via NoC 508, to write a value (e.g., '1') to a 1-bit function doorbell register 524 of the doorbell register group 521 that corresponds to the source processor, target processor pair (e.g., source processor 522 and target processor 523). Source processor 504A includes the HWID of source processor 504A and the HWID of target processor 504B in the memory access request.

After IPC unit 510 receives the memory access request, IPC unit 510 determines whether the HWID of source processor 504A in the memory access request matches the HWID stored in doorbell source register 522. If the HWID of source processor 504A included in the memory access request does not match the HWID stored in doorbell source register 522, IPC unit 510 rejects the memory access request and an error is returned. IPC unit 510 may log the error, e.g., to security processor 501.

If the HWID of source processor 504A included in the memory access request matches the HWID stored in source register 522, IPC unit 510 writes a value (e.g., '1') to function register 524 of respective doorbell register group 521. By writing a value of '1' to function register 524, an interrupt request (IRQ) on the interrupt request lines 519 to one or many target processors may be generated. In some examples, each doorbell register of doorbell registers 520 is configured to output 1-bit interrupt requests to a corresponding target processor.

Once target processor 504B completes the processing of the interrupt request, target processor 504B may send a memory access request to write a value (e.g., '0') to the same doorbell register group (e.g., doorbell register group 521) and clear function register 524 of doorbell register group 521 for another interrupt request. For example, IPC unit 510 receives the memory access request from target processor 504B and may write '0' to function register 524 of doorbell register group 521. In some examples, only the source processor can write a '1' value to the doorbell register for a source processor, target processor pair, and only the target processor can clear the value from that doorbell register by writing a '0' value. IPC unit 510 enforces these write limitations on doorbell registers 520.

In some examples, each function register of doorbell registers 520 may include an implicit counter. In some cases, an implicit counter may prevent a race condition in which a target processor is attempting to clear the implicit counter while a source processor is setting the implicit counter. As one example, IPC unit 510 may write '1' to a least significant bit (LSB) of doorbell register group 521 (e.g., function register 524). By writing to function register 524 of doorbell register group 521, the counter may be increased by 1. Implicit counter may saturate to a maximum value of '1.' In other words, writing to the function register of a doorbell register group with 'LSB=1'b1' while the implicit counter is set to '1' might not change the implicit counter, since the implicit counter is already set to '1.' When the implicit counter is larger than 0, the function register outputs an interrupt request to the respective target processor. In some examples, writing to the function register of a doorbell register group with 'LSB=1'b0' decreases the implicit counter from '1' to '0.' The implicit counter may saturate to a '0' value, meaning that the implicit counter might not go below '0.'

In some examples, an interrupt is raised when there are no errors (e.g., in a normal operation). An error may be logged in error registers (e.g., 'ERR_STATUS' and 'ERR_DATA' registers) if a processor does not have permission to access the doorbell register. Then, an error interrupt will be raised when the ERR_STATUS register is not empty. In some cases, read data 0x0 may be returned if a source processor does not have read permission. The 'ERR_STATUS' may register content including, for example, '[0]=valid,' '[2:1] =error code,' '[11:3]=reserved,' '[19:12]=initiator role ID,'

'[31:20]=address offset' for 'ERR_STATUS' register and '[31:0]=data' for 'ERR_DATA' register.

In some examples, mutex registers 512 may provide mutual exclusion to control access by SoCs 502 to shared resource 506 or other shared resources, such as a portion of memory or an I/O device. Mutex registers 512 may include a set of mutexes, where each mutex of the set of mutexes may control access to a different shared resource. One or more processes executed by one or more processors may use shared resources protected by mutexes in mutex registers 512. A mutex of mutex registers 512 may indicate ownership (or no ownership) of the mutex by, for example, association with a single process running on a processor. The mutex may store a unique ID associated with the owner of the mutex, and allow only the owner to release the mutex from ownership. For example, an owner of a mutex may be defined with both a software identifier (SWID) of a process and a hardware identifier (HWID) of the processor executing the process. The SWID may be defined by software. Hardware-ID may be given by security processor 501 according to a protocol. HWID may represent an interrupt initiator ID, a transaction identifier in the AXI specification (AxID), and/or a role ID and may match the protocol used by the mutex register. An example mutex register including HWID is shown below:

| Security Register Address | Register Name | Register width (bit) | Comment |
| --- | --- | --- | --- |
| 0x0000 | OWNER_ROLEID #0 | 8 | Hardware ID of current owner CPU for mutex register #0, #1, and so on. |
| 0x0004 | OWNER_ROLEID #1 | 8 | |
| ... | ... | | |

Each mutex register is associated with a 32-bit function register that is a writable register having a value and an SWID associated with a process. An example of the function register is shown below:

| Function Register Address | Register Name | Register width (bit) | Comment |
| --- | --- | --- | --- |
| 0x1000 | MUTEX #0 | 32 | Mutex register #0, #1, and so on. |
| 0x1004 | MUTEX #1 | 32 | |
| ... | ... | | |

For ease of illustration, only a single mutex register 513 is illustrated in FIG. 5A. In the example of FIG. 5A, to exclusively use a shared resource 506, a first process running on a first processor (e.g., processor 504A of SoC 502A) may acquire ownership of a mutex corresponding to shared resource 506. To acquire ownership of the mutex corresponding to shared resource 506, the first process running on first processor 504A attempts to write, using a memory access request via NoC 536, a first value (e.g., '1') and an SWID associated with the first process to mutex registers 512. The first processor 504A inserts an HWID of processor 504A into the memory access request. If the first process succeeds in acquiring ownership of a mutex (e.g., because no other process owns a mutex corresponding to shared resource 506), IPC unit 510 stores the value, the SWID of the first process, and the HWID of the first processor 504A in mutex register 513 of mutex registers 512. For example, IPC unit 510 may write mutex register 513 with data field 514 given by 'Bit [31]=1'b1,' data field 515 given by 'Bit [30:0]=SWID' that is defined by a software protocol. Mutex 513 may also include data field 516 specifying the HWID of the first processor 504A. If first process fails to acquire the mutex (e.g., because another process owns the mutex), no error will be returned.

The first process may then read the data in mutex 513. If an SWID of the first process does not match the SWID of mutex 513 corresponding to shared resource 506, then the first process does not own the mutex and cannot use shared resource 506. If the SWID associated with the first process matches the SWID of mutex 513, the first process owns the mutex and can use shared resource 506.

After the owner is done using the shared resource, only the owner may release the mutex from ownership by the process. For example, only the first process may release mutex 513 from ownership. To release mutex 513 and shared resource 506, the first process may issue, via NoC 508, a memory access request to write a second value (e.g., '0') to mutex 513 stored in mutex registers 512 in order to clear it. For example, IPC unit 510 may write mutex 513 with data field 514 given by 'Bit [31]=1'b0,' data field 515 given by 'Bit [30:0]=SWID' that is defined by a software protocol. In some examples, the HWID and SWID of the write request must match what is stored in the mutex. If a processor having an HWID different than the HWID stored in the mutex attempts to clear a mutex, IPC unit 510 may register an error with security processor 501.

Each mutex of mutex register 512 has one owner or zero owners. When a mutex has no owner, its value may be '0x0,' and the value may be acquired during a subsequent writing operation. In some cases, both acquiring ownership of the mutex and releasing the mutex may be performed with atomic operations in order to avoid racing.

Processors may read from mutex register 512. If there is currently no owner, mutex register 512 returns a 0x0. If there is currently an owner, mutex register 512 returns data field 514 given by Bit [31]=1'b1' and data field 515 given by 'Bit [30:0]=SWID.'

Figure 5B:
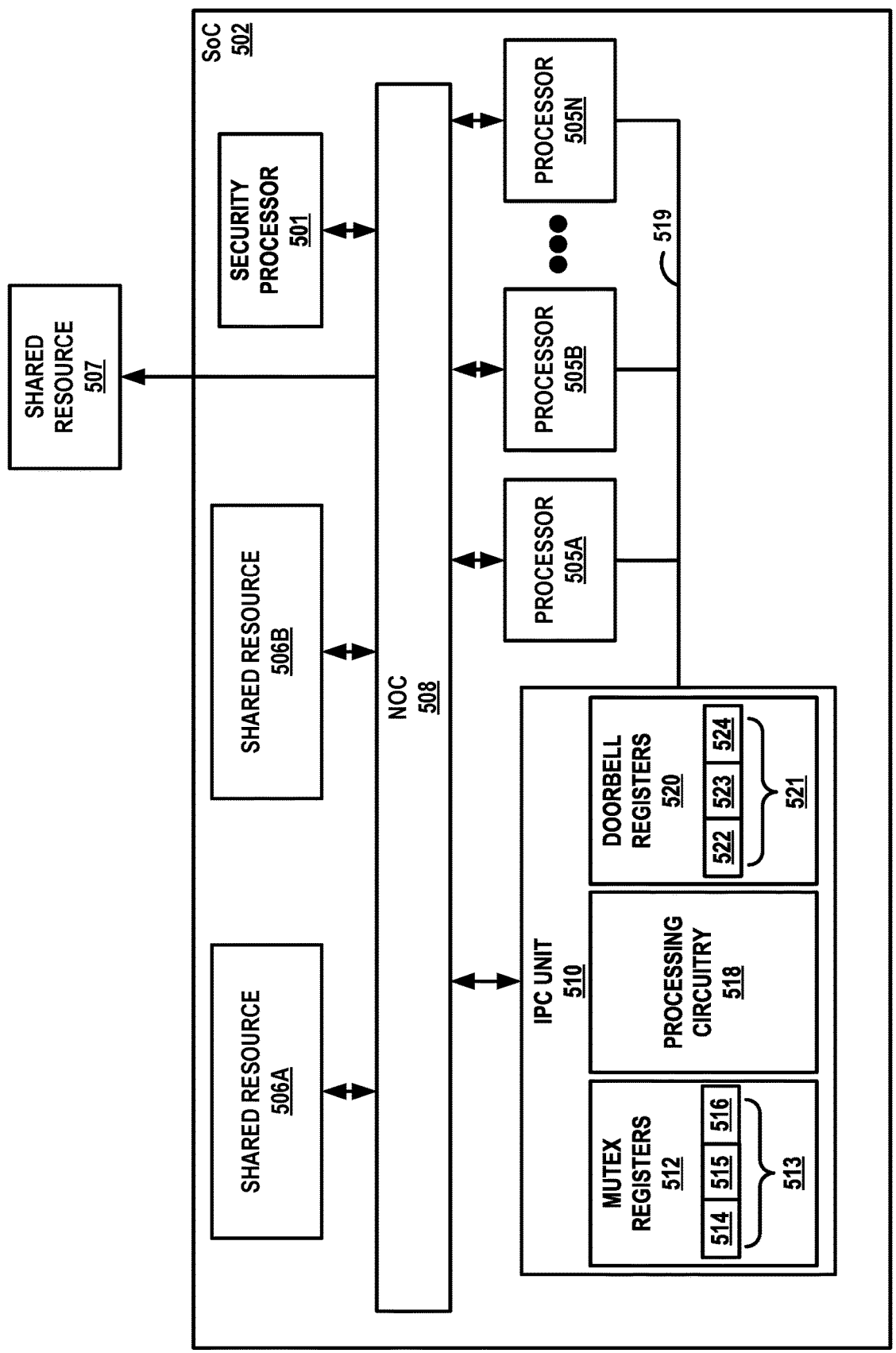
FIG. 5B is a block diagram showing an example implementation of an SoC in which multiple processors of the SoC use inter-processor communication, in accordance with one or more techniques described in this disclosure.
Figure 5C:
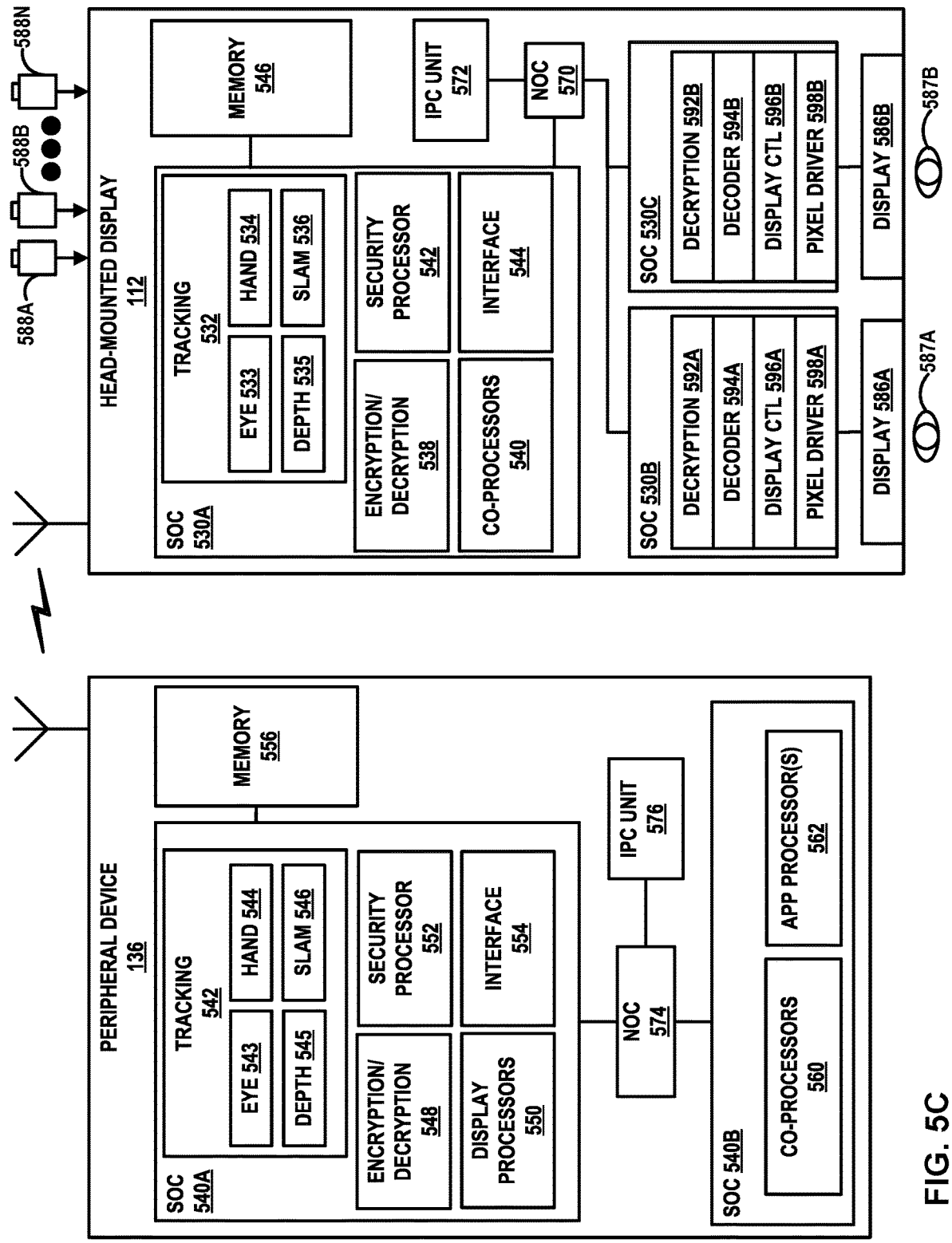
FIG. 5C is a block diagram showing an example implementation of a distributed architecture for a multi-device artificial reality system in which one or more devices (e.g., peripheral device and HMD) are implemented using one or more SoC integrated circuits within each device, in accordance with one or more techniques described in this disclosure.

FIG. 5B is a block diagram illustrating an example implementation in which multiple computer processors of a single SoC use IPC, in accordance with techniques described in this disclosure. Similar to the example described in FIG. 5A, each of the processors 505A-505N of SoC 502 may use registers of the IPC unit 510 to (1) initiate an interrupt request for a target processor or (2) to acquire a lock for a shared resource (e.g., memory, I/O device).

In this example, doorbell registers 520 facilitate IPC between processors 505A-505N (collectively, "processors 505") of a single SoC, e.g., SoC 502. Processors 505 are connected by interrupt request lines 519 to receive interrupt signals from IPC unit 510. Mutex registers 512 protect access to on-chip shared resources 506A-506B and/or off-chip resource 507.

FIG. 5C is a block diagram illustrating a more detailed example implementation of a distributed architecture for a multi-device artificial reality system in which one or more devices (e.g., peripheral device 136 and HMD 112) provide inter-processor communication mechanisms, in accordance with one or more techniques described in this disclosure. As described, peripheral device 136 and HMD 112 are architected and configured to provide IPC mechanisms for SoCs 502A-502B and SoCs 530A-530C, respectively.

In general, the SoCs illustrated in FIG. 5B represent a collection of specialized integrated circuits arranged in a distributed architecture, where each SoC integrated circuit includes various specialized functional blocks configured to provide an operating environment for artificial reality applications. FIG. 5C is merely one example arrangement of SoC integrated circuits. The distributed architecture for a multi-device artificial reality system may include any collection and/or arrangement of SoC integrated circuits for providing an artificial reality environment.

In this example, SoC 530A of HMD 112 comprises functional blocks including tracking 532, an encryption/decryption 538, co-processors 540, security processor 542, and one or more interfaces 544. The functional blocks of SoC 530A may use memory 546 to store various data for the artificial reality content. Memory 546 may represent dynamic random-access memory (DRAM), synchronous DRAM (SDRAM), static RAM (SRAM), or other types of memory to store data. While illustrated with SoC 530A interconnected to SoCs 530B, 530C, and IPC unit 572 via NoC 570, SoC 530A may include an NoC by which functional blocks of SoC 530A may communicate with one another and with an IPC unit of SoC 530A.

Tracking 532 provides a functional block for eye tracking 533 ("eye 533"), hand tracking 534 ("hand 534"), depth tracking 535 ("depth 535"), and/or Simultaneous Localization and Mapping (SLAM) 536 ("SLAM 536"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 538 is a functional block to encrypt outgoing data and decrypt incoming data communicated from peripheral device 136 or other devices. Encryption/decryption 538 may support symmetric key cryptography to encrypt/decrypt data.

Co-application processors 540 includes various processors such as a video processing unit, graphics processing unit, digital signal processors, encoders and/or decoders, and/or others.

Security processor 542 may provide secure device attestation and mutual authentication of HMD 112 when pairing with devices, e.g., peripheral device 136, used in conjunction within the AR environment.

Interfaces 544 includes interfaces for connecting to functional blocks of SoC 530A. As one example, interfaces 544 may include peripheral component interconnect express (PCIe) slots. SoC 530A may connect with SoC 530B, 530C using interfaces 544. SoC 530A may connect with a communication device (e.g., radio transmitter) using interfaces 544 for communicating with other devices, e.g., peripheral device 136.

SoCs 530B and 530C each represents display controllers for outputting artificial reality content on respective displays, e.g., displays 586A, 586B (collectively, "displays 586"). In this example, SoC 530B may include a display controller for display 568A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 568B to output artificial reality content for a right eye 587B of the user. For example, SoC 530C includes decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 136 includes SoCs 540A and 540B configured to support an artificial reality application. In this example, SoC 540A comprises functional blocks including tracking 542, an encryption/decryption 548, one or more display processors 550, security processor 552, and one or more interfaces 554. The functional blocks of SoC 540A may use memory 556 to store various data for the artificial reality content. Memory 556 may represent dynamic random-access memory (DRAM), synchronous DRAM (SDRAM), static RAM (SRAM), or other types of memory to store data. While illustrated with SoC 540A interconnected to SoC 502B and IPC unit 576 via NoC 574, SoC 540A may include an NoC by which functional blocks of SoC 540A may communicate with one another and with an IPC unit of SoC 540A.

Tracking 542 is a functional block providing eye tracking 543 ("eye 543"), hand tracking 544 ("hand 544"), depth tracking 545 ("depth 545"), and/or Simultaneous Localization and Mapping (SLAM) 546 ("SLAM 546"). For example, peripheral device 136 may receive input from one or more accelerometers (also referred to as inertial measurement units or "IMUs") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 542 determines, for example, a current pose for the frame of reference of peripheral device 136 and, in accordance with the current pose, renders the artificial reality content to HMD 112.

Encryption/decryption 548 encrypts outgoing data and decrypts incoming data communicated from HMD 112 or other devices. Encryption/decryption 548 may support symmetric key cryptography to encrypt/decrypt data using a session key (e.g., secret symmetric key).

Display processors 550 includes processors such as a video processing unit, graphics processing unit, encoders and/or decoders, and/or others, for rendering artificial reality content to HMD 112.

Security processor 552 may provide secure device attestation and mutual authentication of peripheral device 136 when pairing with devices, e.g., HMD 112, used in conjunction within the AR environment.

Interfaces 554 include interfaces for connecting to functional blocks of SoC 540A. As one example, interfaces 554 may include peripheral component interconnect express (PCIe) slots. SoC 540A may connect with SoC 540B using interfaces 554. SoC 540A may connect with one or more communication devices (e.g., radio transmitter) using interfaces 554 for communicating with other devices, e.g., HMD 112.

SoC 510B includes co-application processors 560 and one or more application processors 562. In this example, co-application processors 560 includes various processors, such as a vision processing unit (VPU), a graphics processing unit (GPU), and/or central processing unit (CPU). Application processors 562 may include a processing unit for executing one or more artificial reality applications to generate and render, for example, a virtual user interface to a surface of peripheral device 136 and/or to detect gestures performed by a user with respect to peripheral device 136.

As described with respect to the example of FIGS. 5A and 5B, IPC unit 572 may provide inter-processor communication for processors of SoCs 530. For example, IPC unit 572 includes doorbell registers used to generate an interrupt for doorbell. Alternatively, or additionally, IPC unit 572 includes a mutex register to control mutual exclusive access to shared resources, e.g., memory 546 or peripheral device 136. NoC 570 is a communication infrastructure comprising shared busses between components of SoCs 530. For example, NoC 570 and IPC unit 572 may be components of SoC 530A for interconnecting tracking 532, encryption/decryption 548, co-processors 540, security processor 542, and other components of SoC 530A.

Similarly, IPC unit 576 may provide inter-processor communication for processors of SoCs 540. For example, IPC unit 576 includes doorbell registers used to generate an interrupt for doorbell {word missing?}. Alternatively, or additionally, IPC unit 576 includes a mutex register to control mutual exclusive access to shared resources, e.g., memory 546 or peripheral device 136. NoC 574 is a communication infrastructure comprising shared busses between components of SoC 540. For example, NoC 575 and IPC unit 576 may be components of SoC 540A for interconnecting tracking 542, encryption/decryption 548, display processors 550, security processor 552, and other components of SoC 540A.

Figure 6A:
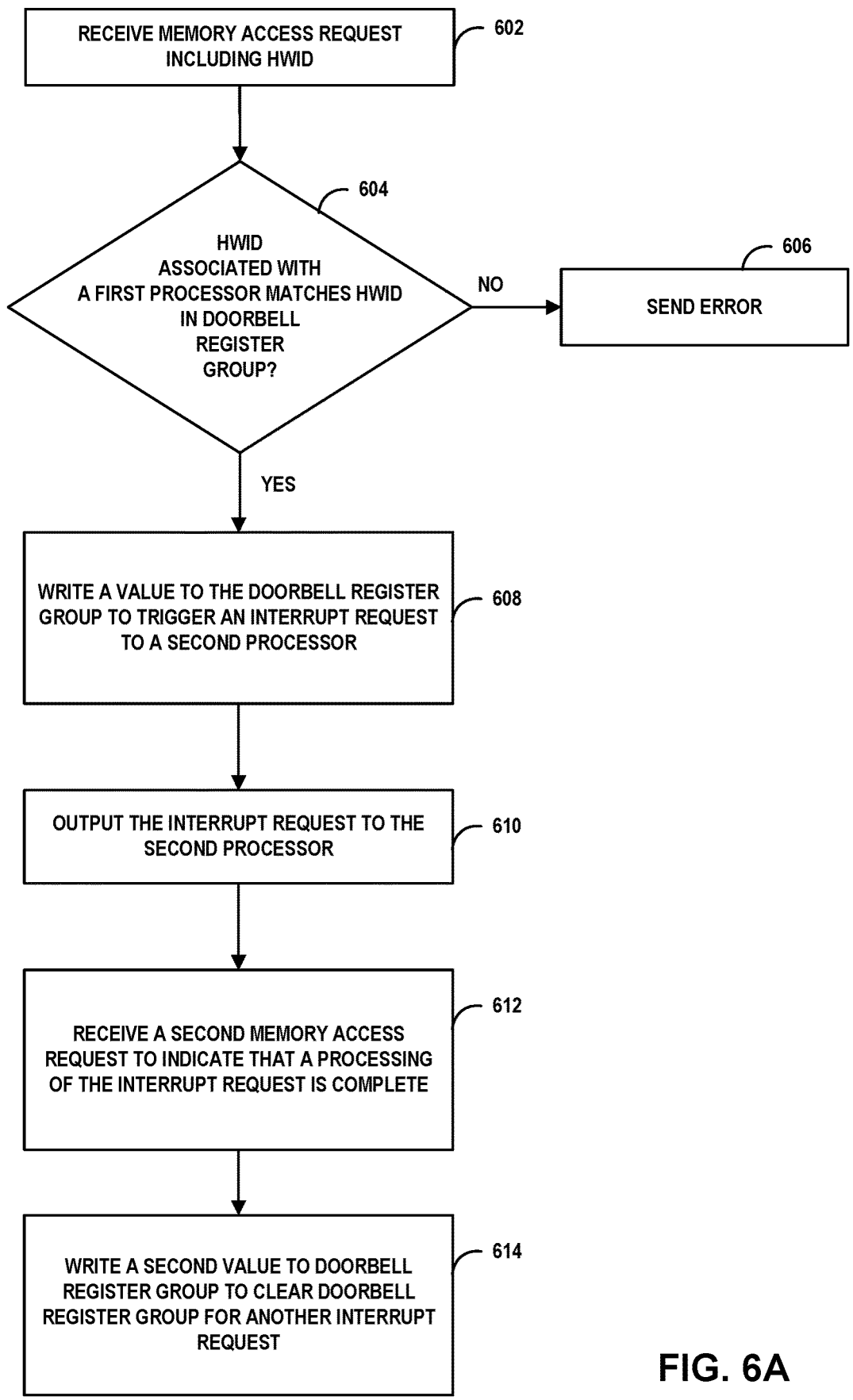
FIGS. 6A-6B are flow diagrams illustrating example operations for inter-processor communication, in accordance with one or more techniques of this disclosure.
Figure 6B:
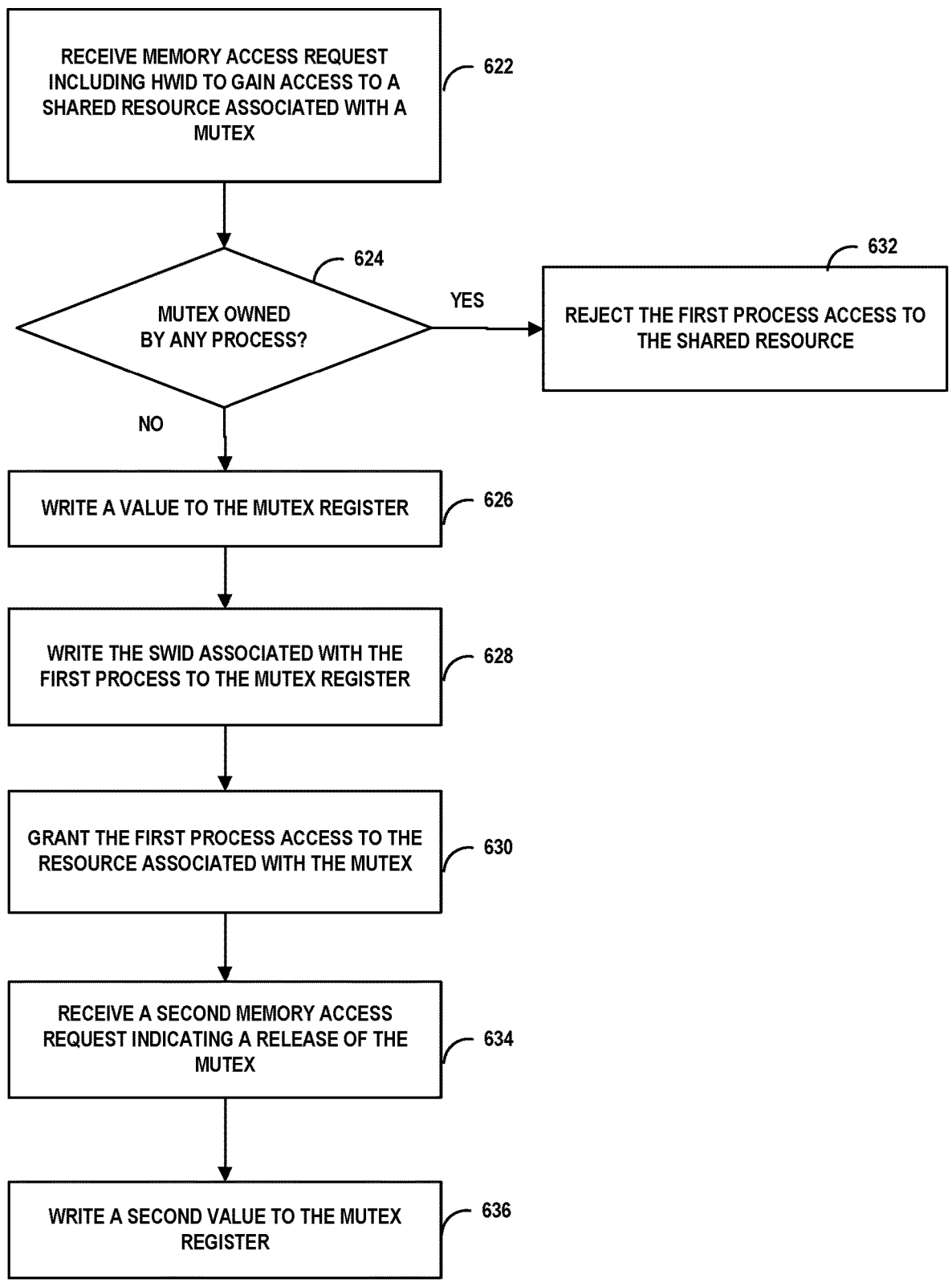

FIGS. 6A-6B are example flow diagrams illustrating example operations for inter-processor communication, in accordance with one or more techniques of this disclosure. For example, FIG. 6A is a flow diagram illustrating an example operation for initiating an interrupt request for a target processor, in accordance with one or more techniques of this disclosure. FIG. 6B is a flow diagram illustrating an example operation for acquiring ownership of a mutex and releasing the mutex from an ownership, in accordance with one or more techniques of this disclosure. FIGS. 6A-6B are described with respect to artificial reality system 500 of FIGS. 5A-5B. However, the techniques of FIGS. 6A-6B may be performed by different components of artificial reality system 500 or by additional or alternative devices.

In the example of FIG. 6A, IPC unit 510 receives, via NoC 508, a memory access request from a first processor (e.g., a source processor), such as processor 504A of device 502 of artificial reality system 500 (602). Processor 504A may represent a processor of SoCs of HMD 112, peripheral device 136, or any device of the artificial reality system. The memory access request may include information indicative of a hardware identifier (HWID) associated with the source processor.

IPC unit 510 determines whether the HWID associated with the source processor matches an HWID for doorbell register group 521 of doorbell register 520 of IPC unit 510 (604). As described above, a security processor may configure, for example, at initial boot, a source processor, target processor pair for doorbell register group 521 of doorbell register 520. If the HWID of the memory access request does not match the HWID in doorbell register group 521 ("NO" branch of 604), IPC unit 510 returns, via NoC 508, an error message to the source processor that indicates that IPC unit 510 rejects the memory access request (606). In some examples, IPC unit 510 outputs, to a security processor via NoC 508, information indicative of a record of the error message returned to the source processor.

If the HWIDs match ("YES" branch of 604), IPC unit 510 writes a value to doorbell register group 521 of doorbell register 520 to trigger an interrupt request to a second processor (e.g., target processor 504B) for the doorbell register group 521 as being linked to the source processor (608). For example, IPC unit 510 may write a value of '1' to a function register 524 of doorbell register group 521, which triggers, via interrupt request line 519, an interrupt request to the target processor 504B to indicate a communication from the source processor 504A to target processor 504B (610).

IPC unit 510 may receive, via NoC 508, a memory access request from target processor 504B (612). The second memory request may indicate that a processing of the interrupt request is complete. IPC unit 510 then writes a second value to the function register 524 of doorbell register group 521 in order to clear doorbell register group 521 for another interrupt request (614). For example, IPC unit 510 may write a value of '0' to function register 524 of doorbell register group 521.

FIG. 6B is a flow diagram illustrating an example operation for acquiring ownership of a mutex and releasing the mutex from an ownership, in accordance with one or more techniques of this disclosure. In the example of FIG. 6B, IPC unit 510 receives, via NoC 508, a memory access request from a first processor, such as processor 504A of device 502 of artificial reality system 500 (622). Processor 504A may represent a processor of HMD 112, peripheral device 136, or any device of the artificial reality system. The memory access request represents a request to gain access to a shared resource associated with a mutex, such as shared resource 506. The memory access request may include information indicative of a software identifier (SWID) associated with a process (e.g., first process) of a first processor. For example, the memory access request may include the values '{1'b1, SWID},' where '1'b1' may cause IPC unit 510 to write the value '1' to a mutex register 513 of mutex registers 512 and 'SWID' may represent the SWID of the first process. IPC unit 510 may write the SWID of the first process to the mutex register 513 of mutex registers 512, indicating that the first process owns the mutex object for shared resource 506. When sending the memory access request, the first processor may also include an HWID associated with the first processor.

IPC unit 510 determines whether the mutex is owned by any process (624) and, based on whether the mutex is owned by any process, controls access to the shared resource. If IPC unit 510 determines that the mutex is not owned by any process ("NO" branch of 624), IPC unit 510 writes a value (e.g., '1') to the mutex register 513 of mutex registers 512

(626) to indicate that the mutex associated with the shared resource 206 is owned by a process (e.g., first process) and writes the SWID associated with the first process to mutex register 513 of mutex registers 512 to indicate that the mutex is owned by the first process (628).

To control access to the shared resource by a process, IPC unit 510 determines whether the mutex is owned by the process requesting access. For example, IPC unit 510 compares the SWID included in the memory access request with an SWID stored in mutex register 512. Based on the comparison of the SWIDs, IPC unit 510 determines whether to grant the process access to the resource associated with the mutex (630). For example, if the SWID included in the memory access request matches the SWID stored in mutex register 512, IPC unit 510 grants the first process access to the shared resource (e.g., memory 506) associated with the mutex.

If IPC unit 510 determines that the mutex is owned by another process ("YES" branch of 624), such as if the SWID included in the memory access request does not match the SWID stored in mutex register 512, IPC unit 510 denies the process access to the shared resource associated with the mutex (632).

Mutex register 512 may subsequently receive, via NoC 508, a second memory access request indicating a release of the mutex from being owned by the first process (634). In this example, IPC unit 510 writes a second value to mutex register 512 in order to release the mutex from being owned by the first process. For example, IPC unit 510 may write '{1'b0, SWID}' to the mutex register 512, thus releasing the mutex object from ownership by the first process.

Figure 7A:
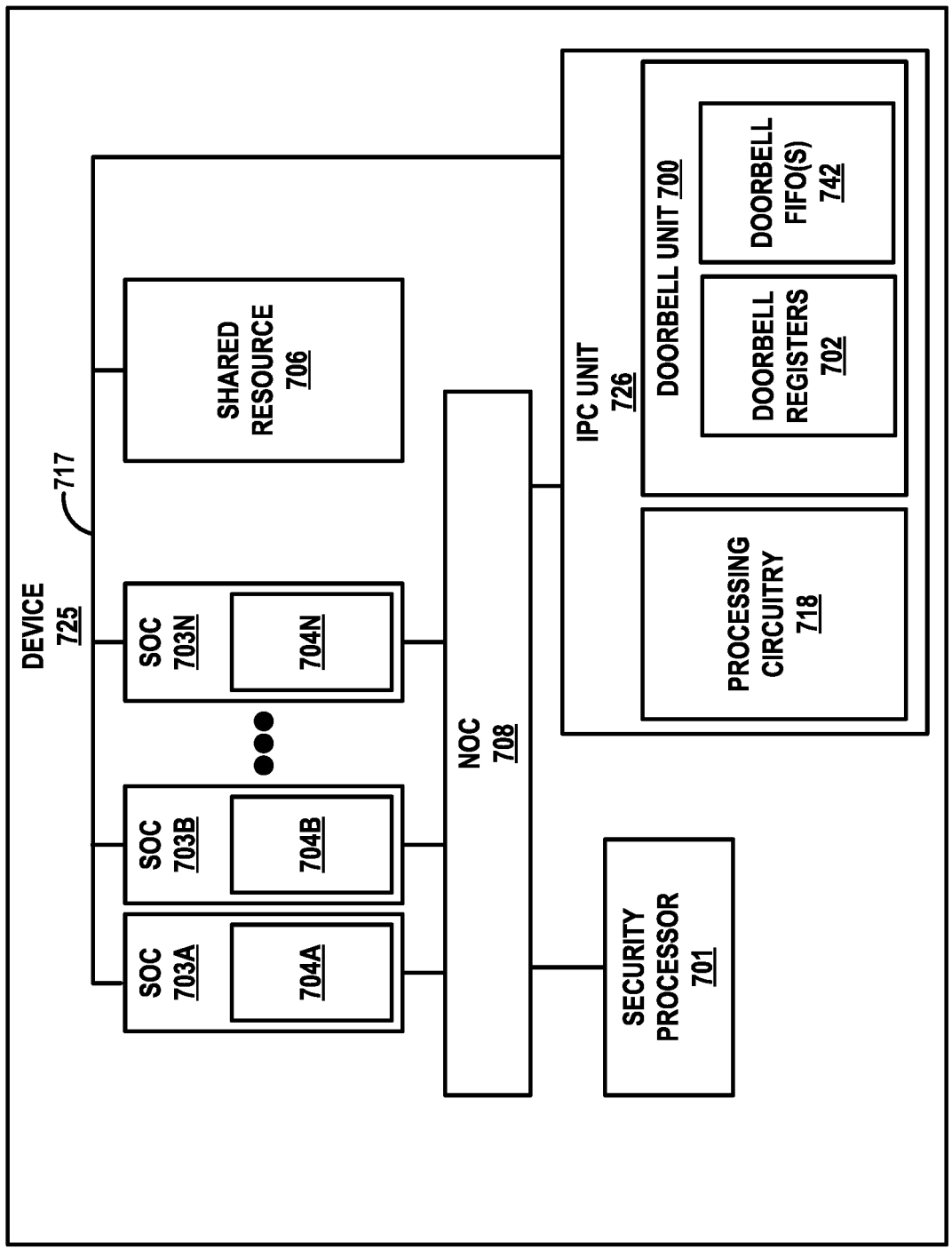
FIG. 7A is a block diagram showing an example implementation for inter-processor communication between processors of two or more SoCs using one or more doorbell FIFO (first-in first-out) memories, in accordance with one or more techniques described in this disclosure.

FIG. 7A is a block diagram showing an example implementation for inter-processor communication between processors of two or more SoCs 703A-703N using one or more doorbell first-in first-out (FIFO) memories 742, in accordance with one or more techniques described in this disclosure.

Similar to device 500 of FIG. 5A, device 725 may be an example of any of HMDs 112 or peripheral device 136 of FIGS. 1A-4, or any device in an artificial reality system, such as artificial reality systems 10, 20 of FIGS. 1A, 1B, or may operate as a stand-alone, mobile artificial reality system configured to implement one or more of the techniques described herein.

In this example, device 725 includes one or more SoC integrated circuits 703A-703N (collectively, "SoCs 703"), a shared memory resource 706, network-on-chip (NoC) 708, and an inter-processor communication (IPC) unit 726. In this example, SoCs 703 include a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components. Each of the functional blocks may be referred to as a subsystem or component of the SoC. Each SoC 703 of device 725 may include one or more processors. In the example of FIG. 7A, SoCs 703A-703N include processors 704A-704N, respectively (collectively, "processors 704"). Processors 704 may include CPUs, DSPs, CNN processors, GPUs, or other processing circuitry for executing instructions. Processors 704 and other components of SoCs 703 may communicate with one another using NOC 708.

In this example, IPC unit 726 includes processing circuitry 718 and a doorbell unit 700. SoCs 703 and security processor 701 operate in conjunction with IPC unit 726 to provide inter-processor communication between processors 704A-704N. This is done by raising an interrupt at the target processor. Although not shown in FIG. 7A, IPC unit 726 may also include mutex registers 512 as shown and described herein with respect to FIGS. 5A and 5B.

Doorbell unit 700 includes logic circuitry configured for communication of notifications (i.e., interrupts) from a source processor (also referred to herein as a "source CPU") of processors 704A-704N to a target processor (also referred to herein as a "target CPU") of processors 704A-704N. Doorbell unit 700 includes a plurality of doorbell registers, referred to generally by reference numeral 702, each of which is associated with a uniquely assigned source CPU and a uniquely assigned target CPU. Each doorbell register 702 provides a mechanism by which the associated source CPU may raise one or more interrupts to the associated target CPU. Each interrupt may include a high priority interrupt or a low priority interrupt. Interrupt(s) may be sent to each of processors 704A-704N on interrupt request lines 717. Processing circuitry 718 controls access to doorbell registers 702 to ensure that only authorized source and/or target CPUs are allowed to read and/or write data to each doorbell register 702.

Doorbell unit 700 further includes one or more doorbell FIFO (first-in first-out) memories 742 configured to store a FIFO data entry associated with each interrupt. Examples of FIFO data entries that may be stored for each interrupt may include, for example, an indication of a completed task, such as the task sequence, task sequence DI, and the result of the task such as task success or task failure. Other examples of FIFO data entries that may be stored for each interrupt may include, for example, a command to start a task, such as task sequence ID, options for the task, and where to find the data to process and where to place the result. In other examples, the FIFO data entry may have a size of zero (e.g., no FIFO data entry). When this occurs, no data is stored in the FIFO but instead software must agree as to where in the system memory the source and target CPUs are going to place messages for each other. However, these examples are for illustrative purposes only, and the disclosure is not limited in this respect. Further details regarding doorbell unit 700 are described herein with respect to FIGS. 8A-8B.

Figure 7B:
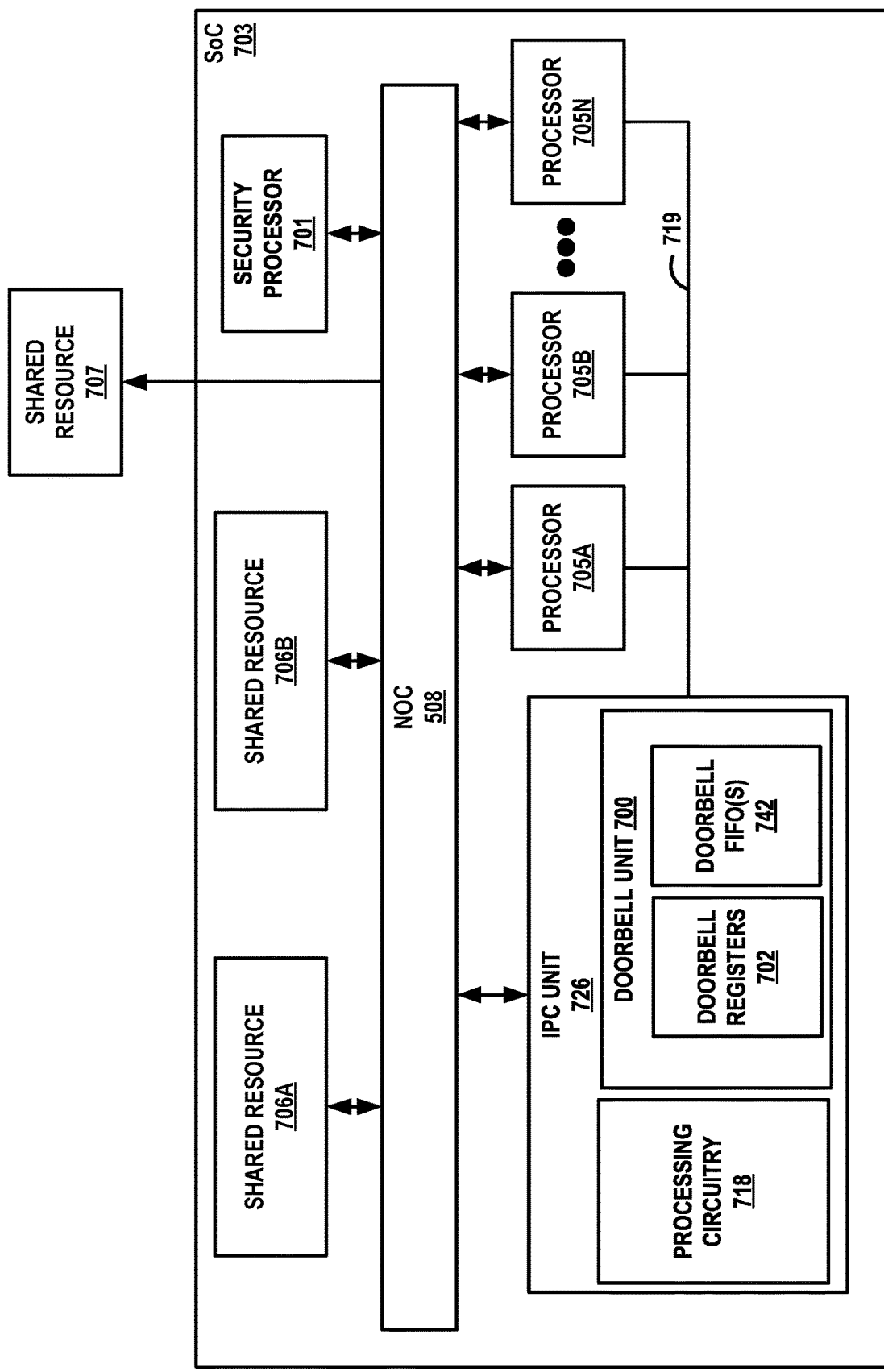
FIG. 7B is a block diagram showing an example implementation for inter-processor communication between two or more processors of an SoC using one or more doorbell FIFO memories, in accordance with one or more techniques described in this disclosure.

FIG. 7B is a block diagram showing an example implementation for inter-processor communication between two or more processors of an SoC 703 using one or more doorbell FIFO memories 742, in accordance with one or more techniques described in this disclosure.

Similar to SoC 502 of FIG. 5B, SoC 703 may form part of an example of HMDs 112 or peripheral device 136 of FIGS. 1A-4, or any device in an artificial reality system, such as artificial reality systems 10, 20 of FIGS. 1A, 1B, or may operate as a stand-alone, mobile artificial reality system configured to implement one or more of the techniques described herein.

SoC 703 includes an IPC unit 726 including processing circuitry 718 and a doorbell unit 700. Doorbell unit 700 includes logic circuitry configured for communication of notifications from a source processor (also referred to herein as a "source CPU") of processors 705A-705N to a target processor (also referred to herein as a "target CPU") of processors 705A-705N. This is done by raising an interrupt at the target processor.

Processors 705A-705N are connected by interrupt request lines 719 to receive interrupt signals from IPC unit 726.

Security processor 701 operates in conjunction with IPC unit 726 to provide inter-processor communication between processors 705A-705N. Although not shown in FIG. 7B, IPC unit 726 may also include mutex registers 512 as shown and described with respect to FIGS. 5A and 5B.

As described above with respect to FIG. 7A, doorbell unit 700 of FIG. 7B includes a plurality of doorbell registers, referred to generally by reference numeral 702, each of which is associated with a uniquely assigned source CPU and a uniquely assigned target CPU. Each one of doorbell registers 702 provides a mechanism by which the associated source CPU may raise one or more interrupts to the associated target CPU. Each interrupt may include a high priority interrupt or a low priority interrupt. Interrupt(s) may be sent to each of processors 705A-705N on interrupt request lines 719. Processing circuitry 718 controls access to doorbell registers 702 to ensure that only authorized source and/or target CPUs are allowed to read and/or write data to each doorbell register 702.

Doorbell unit 700 further includes one or more doorbell FIFO memories 742 configured to store a FIFO data entry associated with each interrupt. Examples of FIFO data entries that may be stored for each interrupt may include, for example, an indication of a completed task, such as the task sequence, task sequence DI, and the result of the task such as task success or task failure. Other examples of FIFO data entries that may be stored for each interrupt may include, for example, a command to start a task, such as task sequence ID, options for the task, and where to find the data to process and where to place the result. In other examples, the FIFO data entry may have a size of zero (e.g., no FIFO data entry).

Figure 8A:
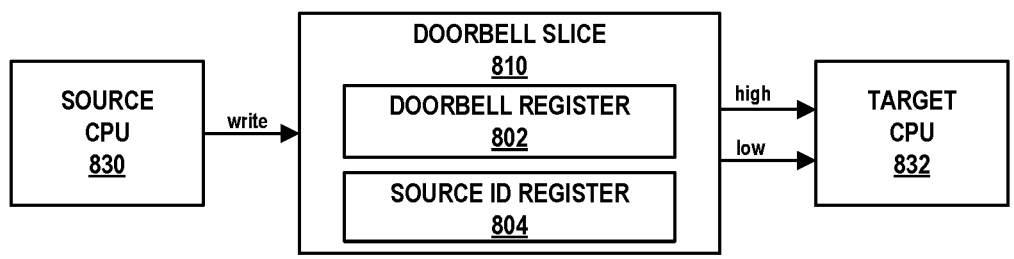
FIG. 8A is a block diagram of an example implementation of one doorbell "slice" of a doorbell unit, in accordance with one or more techniques of this disclosure.

FIG. 8A is a block diagram of an example implementation of one doorbell "slice" 810 of a doorbell unit 700, such as doorbell unit(s) 700 as shown in FIGS. 7A and 7B, in accordance with one or more techniques of this disclosure. Although FIG. 8A shows a specific arrangement and/or grouping of the various components of a slice 810, it shall be understood that other arrangements and/or groupings may also be used to implement each slice 810 of a doorbell unit 800 in accordance with one or more techniques of this disclosure, and that the disclosure is not limited in this respect.

Doorbell slice 810 is associated with a uniquely assigned source CPU 830 and a uniquely assigned target CPU 832, which may represent any of processors 704 or 705. Doorbell slice 810 includes registers and supporting logic circuitry configured to provide inter-processor communication between source CPU 830 and target CPU 832. In this example, doorbell slice 810 includes a doorbell register 802 and a source id register 804 by which source CPU 830 may raise one or more interrupts to target CPU 832. Each interrupt may include a high priority interrupt or a low priority interrupt.

Source id register 804 includes the source id corresponding to source CPU 830. Security mechanisms run by processing circuitry 818 help to enforce the source/target CPU pair's permissions, so that only source CPU 830 having the source id corresponding to the source id stored in source id register 804 is permitted to access (i.e., read and/or write) to the doorbell register 802.

Doorbell register 802 includes a doorbell status field that indicates whether the doorbell interrupt is set or cleared and that, in some examples, also indicates the doorbell priority (high priority or low priority). To raise an interrupt to target CPU 832, source CPU 830 may request to write doorbell data to the doorbell status field of the doorbell register. For example, the doorbell data written by the source CPU 830 (with the actual writes/reads being handled by IPC unit 726) to the doorbell status field may include one of a first value corresponding to a high priority interrupt or a second value corresponding to a low priority interrupt. In this way, the 'high' interrupt request line and the 'low' interrupt request line are not asserted at the same time. In some examples, the doorbell data sets the doorbell interrupt and does not include interrupt priority data. In such examples, all doorbell interrupts have the same priority.

For example, the doorbell status field may include a 2-bit field in the doorbell register 802. In one such example, the value in the least significant bit of the doorbell status field may indicate whether the doorbell interrupt is set or cleared, while the value in the most significant bit of the doorbell status field may indicate whether the doorbell interrupt is a high priority interrupt or a low priority interrupt. To raise an interrupt to target CPU 832, source CPU 830 may write 2-bits of doorbell data to the 2-bit doorbell status field of the doorbell register 802. The doorbell data may include one of a first value corresponding to a high priority interrupt or a second value corresponding to a low priority interrupt. For example, source CPU 830 may write a binary value of '1' to the least significant bit of the doorbell status field to set the doorbell interrupt. Source CPU 830 may further write a binary value of 0 to the most significant bit of the doorbell status field to indicate a high priority interrupt, or write a binary value of '1' to the most significant bit of the doorbell status field to indicate a low priority interrupt. For example:

High priority interrupt: writing a binary '01' to the doorbell status field of doorbell register 802 causes an interrupt immediately on the 'high' interrupt request line.

Low priority interrupt: writing a binary '11' to the doorbell status field of doorbell register 802 causes an interrupt immediately on the 'low' interrupt request line.

Each time a FIFO data entry is read from the FIFO, an IPC unit, such as IPC unit 726 as shown in FIG. 7B, determines whether all FIFO data entries have been read from the FIFO. In other words, each time a FIFO data entry is read from the FIFO, the IPC unit determines whether the FIFO is empty. In response to determining that the FIFO is empty, the IPC unit automatically clears the doorbell interrupt.

The doorbell status field of doorbell register 802 may be considered an implicit doorbell counter. The initial value of the doorbell counter after reset is 0. This doorbell counter catches the race condition when the target CPU has read all the messages from external memory and is clearing a doorbell (possibly multiple writes to clear each ring) while the source CPU is setting it (during the multiple clear writes).

Doorbell register 802 may further include a priority field. In some examples, the priority field includes a 2-bit field in doorbell register 802 that stores the highest priority of any doorbell rings since the last time the doorbell status field equaled 0. For example, the 2-bit priority field may be encoded as follows:

'00'=no priority defined (reset or no rings value)
'01'=high priority
'11'=low priority In some examples, with a high priority successful doorbell ring the priority field may be set to high. With a low successful doorbell ring the priority field may be set to low if it is not already set to high. A successful ring acknowledge may decrease the count by 1. The count may saturate to a 2-bit '00' value and will not wrap around. If an attempt is made to decrement a value of '00', the system will log an error. For example, the system may log an error in one of error log registers 846 as described below.

Figure 8B:
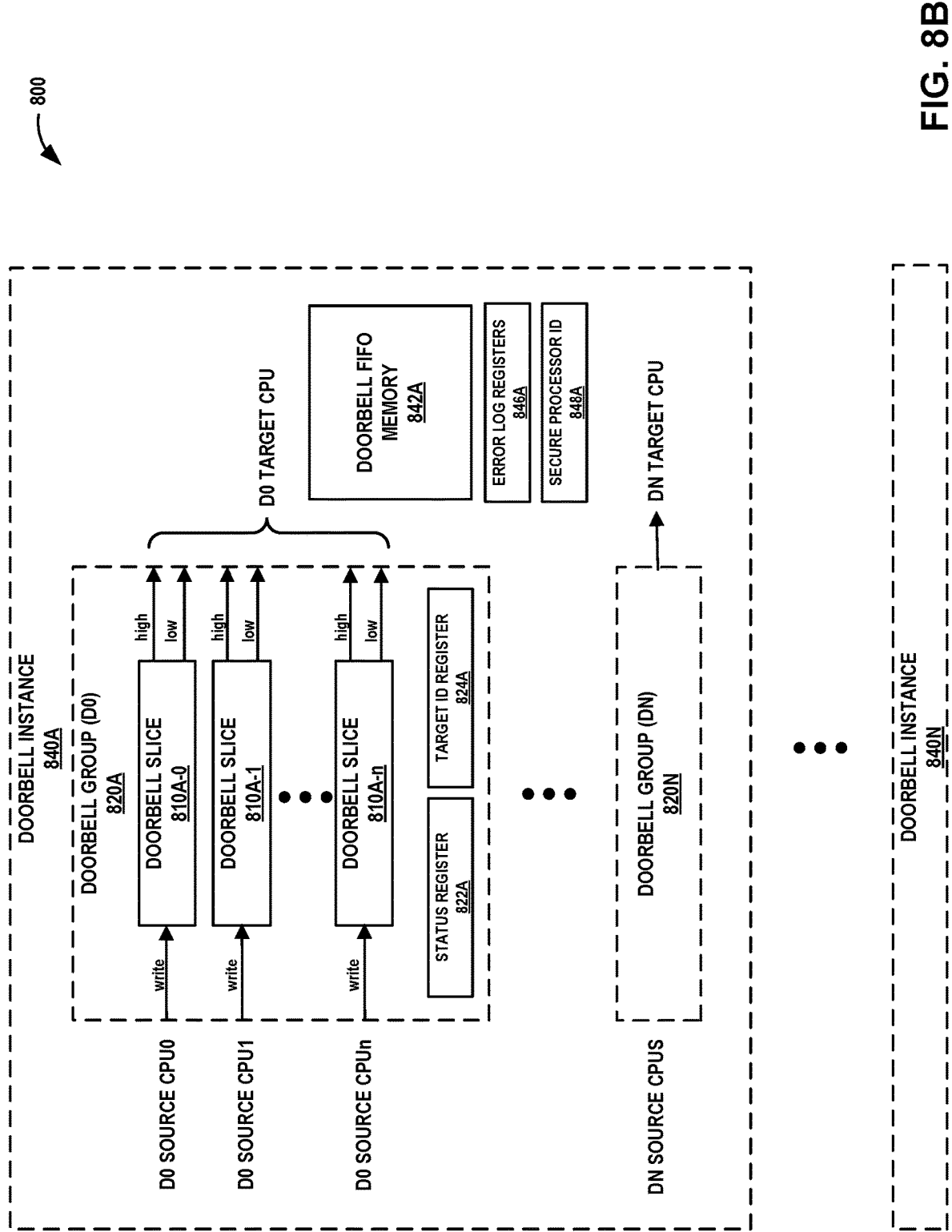
FIG. 8B is a block diagram of an example implementation of a doorbell unit, in accordance with one or more techniques of this disclosure.

FIG. 8B is a block diagram of an example implementation of a doorbell unit 800, in accordance with one or more techniques of this disclosure. Doorbell unit 800 may be used to implement one or both of doorbell units 700 as shown in FIGS. 7A and 7B. Although FIG. 8B shows a specific arrangement and/or grouping of the various components of doorbell unit 800, it shall be understood that other arrangements and/or groupings may also be used to implement doorbell unit 800 in accordance with one or more techniques of this disclosure, and that the disclosure is not limited in this respect.

As shown in FIG. 8B, doorbell unit 800 includes a plurality of doorbell slices 810. Each doorbell slice 810 includes a doorbell register 802 and a source id register 804 as shown in FIG. 8A. One or more doorbell slices 810 are arranged into one or more doorbell groups, such as doorbell groups 820A-820N; in other words each doorbell group 820 includes one or more doorbell slices 810. For example, doorbell group 820A (also labeled doorbell group D0) of FIG. 8B includes n doorbell slices 810A-0 through 810A-n.

Doorbell slices 810 are arranged into doorbell groups 820 such that each doorbell slice 810 in a doorbell group 820 is uniquely mapped to the same single target CPU. In other words, a collection of doorbell slices 810 to a single target CPU from many source CPUs defines a doorbell group. For example, doorbell group 820A includes n doorbell slices 810A-0 through 810A-n, each uniquely associated with a different one of n source CPUs (D0 Source CPU0 through D0 Source CPUn), and each further corresponding to a single uniquely assigned target CPU (D0 Target CPU). In some examples, each source CPU in the group (e.g., D0 Source CPU 0-D0 Source CPUn) may raise a high priority interrupt or a low priority interrupt to the target CPU (e.g., D0 Target CPU) by writing doorbell data to the doorbell status field of the doorbell register in the associated doorbell slice 810. The doorbell data may include one of a first value corresponding to a high priority interrupt or a second value corresponding to a low priority interrupt.

In some examples, the doorbell output interrupt request lines (IRQs) (i.e., 'high' IRQ and 'low' IRQ) from each source CPU in a doorbell group 820 are physically connected to the corresponding target CPU's interrupt controller inputs. In other examples, all of the 'high' IRQs from a given doorbell group may be compressed into a single 'high' port, and all of the 'low' IRQs from a given doorbell group may be compressed into a single 'low' port to save on interrupt ports to the target CPU.

In addition to the one or more doorbell slices 810, each doorbell group 820A-820N includes a corresponding status register 822 and a corresponding target id register 824. For example, doorbell group 820A includes status register 822A and target id register 824A. The target id register 824 of each doorbell group stores the target id corresponding to the uniquely assigned target CPU for that group. Security mechanisms run by processing circuitry 718 (see FIGS. 7A and 7B) help to enforce the source/target CPU pair's permissions, so that only a target CPU having the target id corresponding to the target id stored in the target id register 824 is permitted to access (e.g., read and/or write) to the doorbell registers 802 for the group.

A collection of one or more doorbell groups 820A-820N defines a doorbell instance 840. For example, a representative doorbell instance 840A as shown in FIG. 8B includes N doorbell groups 820A-820N. The number of doorbell groups 820A-820N in each doorbell instance 840 is configurable by security processor 801 of FIGS. 8A and 8B. Doorbell groups 820A-820N may, but do not necessarily, have the same number of slices 810 in each group. The number of slices 810 in each group 820 may depend at least in part on the number of source CPUs that may raise a doorbell interrupt to the associated target CPU for the group.

Each doorbell instance 820A-820N further includes a doorbell FIFO memory 842, error registers 846, and a secure processor ID register 848. Doorbell FIFO memory 842, error registers 846, and secure processor ID register 848 are shared among all doorbell groups 820 of the associated doorbell instance 840. For example, doorbell FIFO memory 842A, error registers 846A, and secure processor ID register 848A are shared among doorbell groups 820A-820N of doorbell instance 840A.

Each doorbell FIFO memory 842 is configured to store doorbell data in the form of one or more FIFO data entries associated with interrupt(s) generated in the doorbell instance 840. In general, the data stored in doorbell FIFO memory 842 may be any arbitrary data determined by the application. Each source CPU in a doorbell instance 840 can write doorbell data associated with a doorbell interrupt to the doorbell FIFO memory 842 associated with that instance in order to communicate the doorbell data to a target CPU. This enables the source CPU to write, in conjunction with writing a value to a doorbell register to trigger a doorbell interrupt to a target CPU, a direct or indirect message to a corresponding doorbell FIFO memory. The target CPU may obtain the message in response to receiving the doorbell interrupt.

The techniques may involve one or more technical advantages or improvements that realize at least one practical application. For example, doorbell FIFO memory 842 in conjunction with a doorbell interrupt may alleviate at least some direct communication between a source CPU and a target CPU that would otherwise be required. In addition, because the doorbell FIFO memory 842 is local to the doorbell registers 802 (that is, they are physically located within the same IPC unit 726), the target CPU in the case of direct messages may avoid accessing remote or external memory to obtain data communicated from a source CPU, and instead can obtain the data from the local doorbell FIFO memory. Thus, the use of a doorbell FIFO memory may significantly reduce latency for simple messages between source and target CPUs. In addition, high and low priority doorbell interrupts may reduce overall power usage in a system because target CPUs are transitioned from a sleep or lower power state to an active state upon receipt of a high priority interrupt but not upon receipt of a low priority interrupt. Because the target CPUs in a system are transitioned from a sleep or lower power state to an active state less often (e.g., not upon receipt of low priority interrupts), overall power savings may be achieved.

In some examples, each doorbell FIFO memory 842 may be dynamically allocated by the applications among doorbell slices 810 within each doorbell group 820 of the doorbell instance 840. The total FIFO storage available to each doorbell group 820 may be statically determined, but software may be free to allocate that storage among the different doorbell slices 810 in each group 820. The FIFO memory allocation for each doorbell instance 840 may depend, for example, on the number of doorbell slices 810 in each doorbell group 820 and/or the number of doorbell groups 820 in the doorbell instance 840. In one example, the doorbell FIFO memory is allocated equally among doorbell groups 820 in a doorbell instance 840, while the amount of FIFO memory assigned to each group may be dynamically allocated among the doorbell slices 810 in the group. If there are a relatively larger number of doorbell slices 810 in a doorbell instance 840, for example, each doorbell slice 810 may be allocated a relatively smaller number of words in the FIFO as compared to a doorbell instance 840 having a relatively fewer number of doorbell slices 810.

In some examples, the amount of doorbell FIFO memory 842 allocated to each doorbell slice 810 may have a software programmable depth of 2, 4, 8 or 16 words. Each doorbell group 820 of a doorbell instance 840 may be assigned a fixed share of the FIFO memory 842. Each doorbell slice 810 may then determine the memory it needs based on the size of the FIFO per doorbell and the number of doorbells in the group rounding to the next power of 2. The doorbell groups with the largest memory need (e.g., doorbell groups having a relatively larger number of doorbell slices) may be assigned first so that each group is aligned to its memory need. In such examples, a doorbell group with 16 doorbells of 8 words each will require a 128×32 memory (16×8=128 and assuming a 32-bit word). A doorbell group with 17 doorbells of 4 words each would also require a 128×32 memory (17×4=68, which is rounded up to the next power of 2, or 128).

Within each portion of the doorbell FIFO memory 842 statically allocated to each doorbell group 820, software may dynamically allocate the memory within that portion among the doorbell slices 810 within the group 820. For the example of a doorbell group with 16 doorbells of 8 words each, if the application increases the amount of memory in the doorbell FIFO memory 842 to more than 16 words for one or more of the doorbell slices 810 in the group, certain of the other doorbell slices 810 in the group may be decreased to 2 or 4 words to stay within the 128 memory allocation footprint.

In order to leave a message and "ring the doorbell" (i.e., raise an interrupt) to a target CPU 832, a source CPU 830 transmits one or more memory access request(s) to IPC unit 826. The purpose of these memory access request(s) is to request the IPC unit 826 to write one or more FIFO data entr(ies) associated with an interrupt to the doorbell FIFO memory. Each FIFO data entry may include, for example, a message header and message data. The message header may include, for example, a source id corresponding to source CPU 830, a target id corresponding to target CPU 832, a message id and a direct/indirect flag. The direct/indirect flag is indicative of whether the message data portion of the FIFO data entry is a direct message or an indirect message. In the case of a direct message, the message data portion of the FIFO data entry includes a relatively short message for the target CPU sized to fit within the portion of the doorbell FIFO memory uniquely allocated to the source id/target id indicated in the memory access request to write the FIFO data to the FIFO. The message data portion of the memory access request includes the FIFO data entry to be written to the FIFO.

In some examples, depending upon the word size for each FIFO data entry and the number of words allotted to each interrupt message, one or more memory access request(s) may in some examples be needed to write all of the FIFO data entries to the FIFO.

Processing circuitry 818 of IPC unit 826 manages memory access requests (e.g., writing to and/or reading from) to each doorbell register 802 and doorbell FIFO memory 842 based in part on the values stored in the source id register 804 in each doorbell slice 810 and the target id register 824 for each doorbell group 820. In general, if a request to read from and/or write to a particular doorbell register 802 or doorbell FIFO memory 842 does not match the source id stored in source id register 804, processing circuitry 818 logs an error in one of error registers 846 corresponding to the doorbell instance 840 of which the doorbell register 820 in question is a member.

Processing circuitry 718 of IPC unit 726 determines if the source id in the memory access request matches the source id stored in the source id register 804. If the source id matches, IPC unit 726 checks whether the FIFO memory is full, and, if the FIFO memory is full, IPC unit 726 sets a failed ring status error in a status register (e.g., status register 822). Assuming the FIFO memory is not full, IPC unit 726 writes the FIFO data entr(ies) received in the message data portion of the memory access request(s) to the portion of doorbell FIFO memory 842 uniquely allocated to the doorbell register 802 (or slice 810) associated with the source CPU 730/target CPU 732 indicated in the message header portion of the memory access request. Upon a successful write, IPC unit 726 increments the FIFO counter to maintain a current count of the number of entries in the doorbell FIFO memory 742. If multiple memory access requests to write multiple FIFO data entries are received, IPC unit 726 checks whether the FIFO is full, writes each FIFO data entry to the FIFO memory 842 and increments the FIFO counter upon each successful write, and continues until all FIFO data entries received from the source CPU 830 have been written to the FIFO memory.

Source CPU 830 reads the failed ring status to verify that all FIFO data entries associated with the interrupt were written to the FIFO memory. If the failed ring status indicates an error, source CPU 830 executes some form of exception handling to address the error.

If the writes were successful, source CPU 830 transmits a memory access request to IPC unit 826 to "ring the doorbell." By ringing the doorbell, an interrupt is generated to alert target CPU that FIFO data from source CPU 830 to target CPU 832 has been written to the FIFO memory. The memory access request to ring the doorbell includes the source id corresponding to source CPU 830, the target id corresponding to the target CPU 832, and the doorbell data corresponding to the priority level of the doorbell interrupt. Processing circuitry 718 of IPC unit 726 determines whether the source id is valid, and if so, processing circuitry 718 of IPC unit 726 writes the doorbell data to the doorbell status field of the doorbell register 802 defined by the source id and target id contained in the memory access request to ring the doorbell. For example, the source CPU "rings the doorbell" to the target CPU by requesting to write doorbell data to the doorbell status field of the doorbell register 802. Upon receipt of the memory access request to ring the doorbell, IPC unit 726 writes the doorbell data to the doorbell register. The doorbell data may include one of a first value corresponding to a high priority interrupt or a second value corresponding to a low priority interrupt to the doorbell register.

In this example, the doorbell FIFO entr(ies) associated with an interrupt must be successfully written before the source CPU is permitted to write to the doorbell register (i.e., ring the doorbell). This helps ensure that all of the FIFO data associated with the doorbell interrupt is present in the FIFO memory before generating a corresponding interrupt to the target CPU. In addition, in some examples, in order for a doorbell ring to be successful, all FIFO data associated with previous rings must be successfully written to the FIFO memory 842. This helps ensure that any FIFO data associated with a previous interrupt is completely written before another interrupt is permitted. The failed ring status information stored in status register 822 indicates whether a write to the FIFO was successful. Source CPU 830 checks the failed ring status after attempting to write all FIFO data entries associated with an interrupt and is not permitted to write to the doorbell register unless the failed ring status indicates that all FIFO data entries were successfully written.

Writing of the doorbell data to the doorbell register by IPC unit 726 automatically generates one of a high priority interrupt or a low priority interrupt to target CPU 832. Processing of the doorbell interrupt by target CPU 832 depends on whether the interrupt is a high priority interrupt or a low priority interrupt. In accordance with one or more techniques of this disclosure, high and low priority interrupts are handled differently by target CPU 832 to increase power savings and/or reduce battery usage of target CPU 832. For example, when target CPU 832 is in an active state at the time when either a high priority interrupt or a low priority interrupt is received from IPC unit 726, target CPU 832 processes the high priority interrupt or the low priority interrupt immediately upon receipt.

As another example, when target CPU 832 is in a sleep or low power state at the time a high priority interrupt is received from IPC unit 726, target CPU 832 wakes up and processes the high priority interrupt. Alternatively, when target CPU 832 is in a sleep or low power state at the time a low priority interrupt is received from IPC unit 726, target CPU 832 remains in the sleep or low power mode. In such examples, target CPU 832 reads the FIFO data entr(ies) associated with the low priority interrupt at a later time (for example, when a high priority interrupt is received while in the sleep state or when a high or low priority interrupt is received while in the active state).

To process the doorbell interrupt, target CPU 832 transmits a memory access request to read the FIFO data entries to IPC unit 726. The purpose of this memory access request is to request permission to read the FIFO data entr(ies) corresponding to an interrupt. The memory access request to read the FIFO data entries includes the target id of target CPU 832 and the source id of source CPU 830 associated with the interrupt. Processing circuitry 718 of IPC unit 726 verifies that the target id contained in the memory access request to read the FIFO data entr(ies) from the FIFO is valid. If the target id is valid, IPC unit 726 reads all of the FIFO data entr(ies) from the portion of the doorbell FIFO memory allocated to the doorbell register 802 defined by the source id and target id in the memory access request and transmits all of the FIFO data entr(ies) to the target CPU 832. Upon a successful read of each FIFO data entry, processing circuitry 718 of IPC unit 726 decrements the FIFO counter to maintain a current count of the number of data FIFO entries in the doorbell FIFO memory. IPC unit 726 continues to read each FIFO data entry and decrement the FIFO count until the FIFO memory associated with the source CPU 830 and target CPU 832 is empty. In this way, IPC unit 726 transmits all of the FIFO data entr(ies) associated with both high and low priority interrupts that have been written to the FIFO data memory since the last time it was read by target CPU 832.

Each time a FIFO data entry is read from the FIFO, IPC unit 726 determines whether all FIFO data entries have been read from the FIFO data memory. In other words, each time a FIFO data entry is read from the FIFO data memory, IPC unit 726 determines whether the FIFO data memory is empty. In response to determining that the FIFO is empty, IPC unit 726 automatically clears the doorbell interrupt.

Figure 9A:
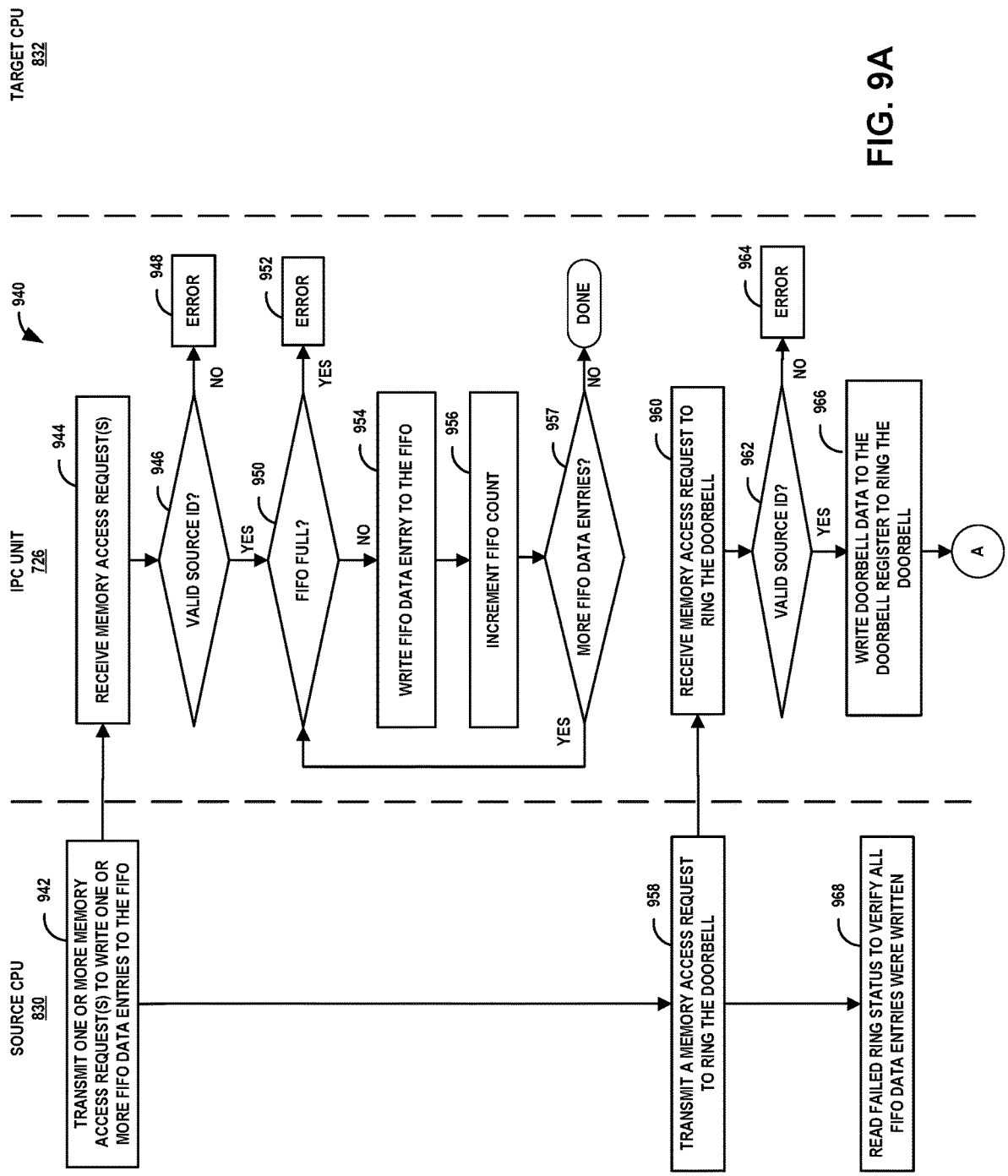
FIGS. 9A-9B are flow diagrams illustrating an example process by which a source processor and a target processor may communicate using a doorbell FIFO memory, in accordance with one or more techniques described in this disclosure.
Figure 9B:
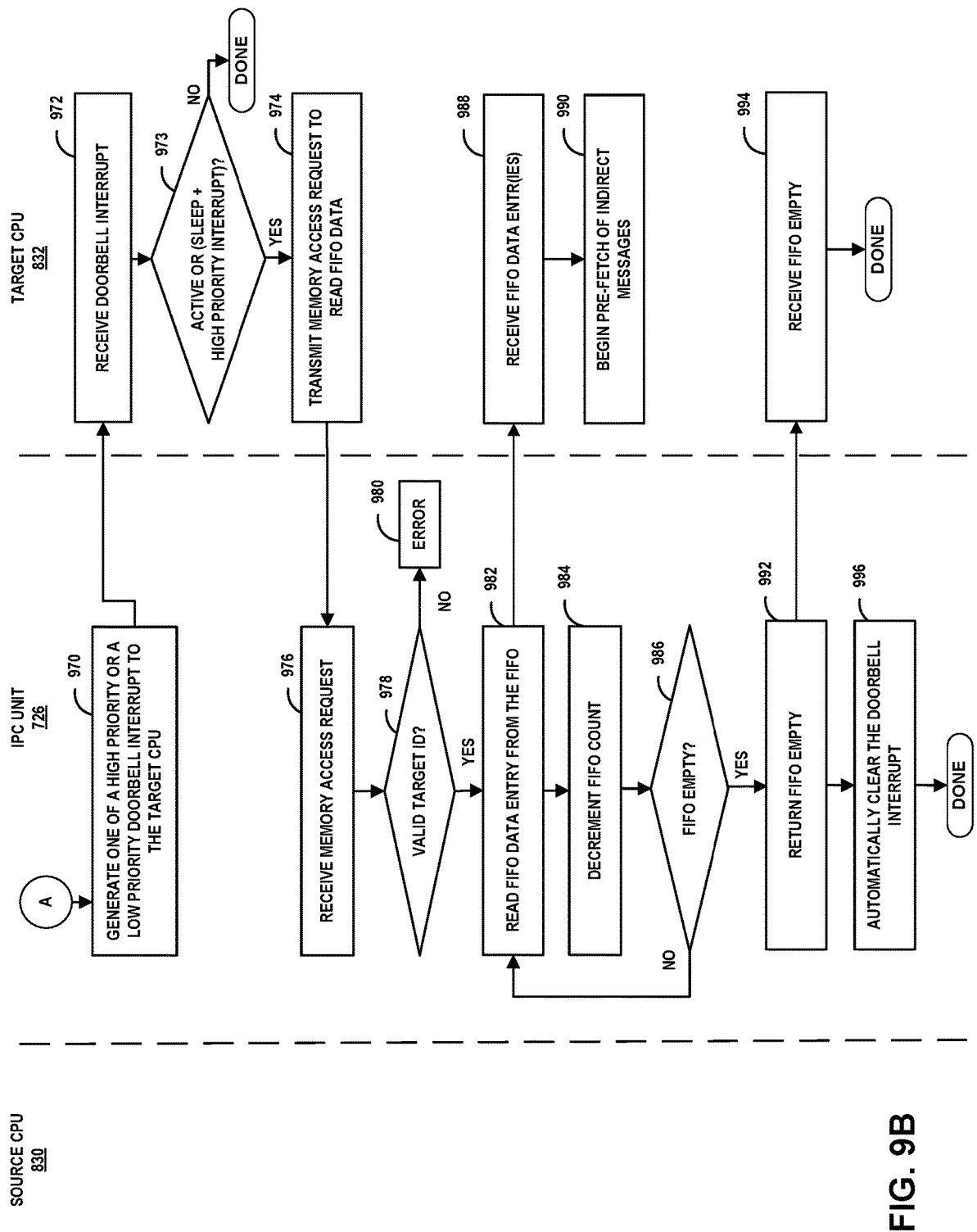

FIGS. 9A-9B are flow diagrams illustrating an example process (940) by which a source processor 830 and a target processor 832 may communicate using a doorbell FIFO memory, in accordance with one or more techniques described in this disclosure.

A source CPU 830 transmits a memory access request to IPC unit 726 (942). The memory access request includes, for example, a source id corresponding to source CPU 830, a target id corresponding to a target CPU 832 and a FIFO data entry to be written to the doorbell FIFO memory 742/842 in the IPC unit 726.

Processing circuitry 718 of IPC unit 726 receives the memory access request (944) and determines whether the source id contained in the memory access request matches the source id stored in a source id register of the doorbell group (946). If the source id contained in the memory access request is not valid (NO branch of 946), processing circuitry 818 logs an error (948). If the source id is valid (YES branch of 946), processing circuitry 818 of IPC unit 726 checks whether the doorbell FIFO memory associated with the memory access request is full (950). If the FIFO count is full (YES branch of 950), processing circuitry 718 of IPC unit 726 resets the FIFO back to the last successful ring and logs an error (952). For example, processing circuitry 818 of IPC unit 726 may set a failed ring status in status register 822 to indicate that the write of the FIFO data entry was not successful.

Assuming there is space available in the portion of the doorbell FIFO memory that is uniquely associated with the source id/target it contained in the memory access request (NO branch of 950) processing circuitry 718 of IPC unit 726 writes the FIFO data entry to that portion of the doorbell FIFO memory (954). Processing circuitry 718 further increments the FIFO count in the status register to maintain a current count of the number of entries in the doorbell FIFO memory (956). If there are more FIFO data entries to be written (YES branch of 957), processing circuitry 718 of IPC unit 726 continues writing the FIFO data entries to the doorbell FIFO memory (954) and incrementing the FIFO count (956) until all FIFO data entries have been written (NO branch of 957).

Source CPU 830 transmits a memory access request to ring the doorbell to IPC unit 726 (958). This memory access request includes, for example, the source id corresponding to source CPU 830, the target id corresponding to target CPU 832 and the doorbell data to "ring the doorbell." For example, the memory access request to ring the doorbell may include a request to write doorbell data to the doorbell status field of the doorbell register. The doorbell data may include one of a first value corresponding to a high priority interrupt or a second value corresponding to a low priority interrupt.

Source CPU 830 reads the failed ring status to verify that all FIFO data entries associated with the interrupt were written to the FIFO memory (968). If the failed ring status indicates an error, source CPU 830 executes some form of exception handling to address the error.

IPC unit 826 receives the memory access request to ring the doorbell (960) and determines whether the source id contained in the memory access request matches the source id stored in a source id register of a doorbell register of the doorbell group (962). If the source id contained in the memory access request is not valid (NO branch of 962), processing circuitry 818 of IPC unit 726 logs an error (964).

If the source id is valid (YES branch of 962), processing circuitry 718 of IPC unit 726 "rings the doorbell" by writing the doorbell data to the doorbell register 802 associated with the source id and the target id contained in the memory access request (966). For example, the doorbell register 802 may include a doorbell status field to which processing circuitry 718 of IPC unit 726 writes the doorbell data. The doorbell data may include one of a first value corresponding to a high priority interrupt or a second value corresponding to a low priority interrupt. In one example, the doorbell status field may include a 2-bit field in which the least significant bit determines whether the doorbell interrupt is set or cleared and the most significant bit determines whether the interrupt is a high priority interrupt or a low priority interrupt.

As shown in FIG. 9B, writing the doorbell data to the doorbell status field of doorbell register 802 (966) causes IPC unit 726 to generate an interrupt to the associated target CPU 726 (970). The interrupt is one of a high priority interrupt or a low priority interrupt depending upon whether the first value corresponding to a high priority interrupt or the second value corresponding to a low priority interrupt is written to the doorbell register, respectively.

Target CPU 832 receives the doorbell interrupt (972). In accordance with one or more techniques of this disclosure, high and low priority interrupts are handled differently by target CPU 832 to increase power savings and/or reduce battery usage of target CPU 832. For example, when target CPU 832 is in an active state at the time when either a high priority interrupt or a low priority interrupt is received from IPC unit 726, target CPU 832 processes the high priority interrupt or the low priority interrupt immediately upon receipt (YES branch of 973). As another example, when target CPU 832 is in a sleep or low power state at the time a high priority interrupt is received from IPC unit 726, target CPU 832 wakes up and processes the high priority interrupt (YES branch of 973). Alternatively, when target CPU 832 is in a sleep or low power state at the time a low priority interrupt is received from IPC unit 726, target CPU 832 remains in the sleep or low power mode (NO branch of 973). In such examples, target CPU 832 reads the FIFO data entr(ies) associated with the low priority interrupt at a later time (for example, when a high priority interrupt is received while in the sleep state or when a high or low priority interrupt is received while in the active state).

By providing for high and low priority interrupts, overall power usage by target CPU may be reduced. Target CPU remains in a sleep or low power state upon receipt of low priority interrupts, while target CPU wakes up or returns to an active state from a sleep or low power state upon receipt of high priority interrupts. Because target CPU 832 is not woken up (e.g., transitioned from a sleep or lower power state to an active state) every time a low priority interrupt is received, an increase in power savings by target CPU 832 can be achieved.

To process the interrupt, target CPU 832 transmits a memory access request to read the FIFO data entries from the FIFO to IPC unit 726 (974). This memory access request includes, for example, the source id corresponding to source CPU 830, and the target id corresponding to a target CPU 832.

Processing circuitry 818 of IPC unit 826 receives the memory access request to read the FIFO data entries (976) and determines whether the target id contained in the memory access request matches the target id stored in a target id register of the doorbell group (978). If the target id contained in the memory access request to read the FIFO data entries is not valid (NO branch of 978), processing circuitry 818 of IPC unit 726 logs an error (980).

If the target id is valid (YES branch of 978), processing circuitry 718 of IPC unit 726 reads the most recent FIFO data entry from the portion of the doorbell FIFO memory uniquely assigned to the doorbell register defined by the source id and target id contained in the memory access request to read the FIFO data entr(ies)(982). Upon successfully reading the FIFO data entry (982), processing circuitry 718 of IPC unit 726 decrements the FIFO count in the status register to maintain a current count of the number of entries in the doorbell FIFO memory (984).

IPC unit 726 determines whether the FIFO is empty (e.g., whether all FIFO data entries have been read from the FIFO memory) (984). For example, IPC unit 726 may compare read and write pointers to determine whether the FIFO is full, empty, or partially full. If the FIFO is not empty (NO branch of 986), IPC unit 726 continues to read the most recent FIFO data entry (982), transmit the FIFO data entry to target CPU 832 (988) and decrement the FIFO counter (984) until all FIFO data entries have been read (YES branch of 986).

Target CPU 832 receives the FIFO data entr(ies) from IPC unit 726 (988). If the direct/indirect flag of the FIFO data entry indicates that the message is an indirect message, the target CPU 832 may start pre-fetching of the indirect message payload from the memory location indicated by the pointer in the FIFO data entry (990).

When all FIFO data entries have been read (YES branch of 986), IPC unit 726 returns a FIFO empty message to target CPU 832 (992, 994). The FIFO empty message indicates to the target CPU 832 that all FIFO data entries have been read. The FIFO empty message may be any predefined message designated to indicate that all FIFO data entries have been read. In some examples, the FIFO empty message may include a FIFO data entry wherein each bit in the FIFO data entry is set to zero. In that example, when target CPU 832 receives a FIFO data entry of all zeros, target CPU 832 knows that all FIFO data entries associated with any high and/or low priority interrupts received since the last time target CPU 832 read the FIFO memory have been received.

In addition, in response to determining that the FIFO is empty (YES branch of 986) and return of the FIFO empty message (992), IPC unit 726 automatically clears the doorbell interrupt (996). This completes the example process by which a source processor 830 and a target processor 832 may communicate using a doorbell FIFO memory.

In accordance with one or more techniques of this disclosure, the use of a doorbell FIFO memory in conjunction a doorbell interrupt may alleviate at least some direct communication between a source CPU and a target CPU that would otherwise be required to communicate certain messages. In addition, because the doorbell FIFO memory is local to the doorbell registers, the target CPU in the case of direct messages may avoid accessing remote or external memory to obtain data communicated from a source CPU, but instead can obtain the data from the local doorbell FIFO memory. Thus, the use of a doorbell FIFO memory may significantly reduce latency for simple messages between source and target CPUs. In addition, use of high and low priority interrupts may reduce overall power usage in a system because target CPUs are transitioned from a sleep or lower power state to an active state upon receipt of a high priority interrupt but not upon receipt of a low priority interrupt. Because the target CPUs in a system are transitioned from a sleep or lower power state to an active state less often (e.g., not upon receipt of low priority interrupts), overall power savings may be achieved.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An artificial reality system comprising:
   a plurality of processors;
   an inter-processor communication (IPC) unit comprising:
   a doorbell register uniquely associated with a source processor of the plurality of processors and a target processor of the plurality of processors; and
   a doorbell first-in first-out (FIFO) memory, wherein a portion of the doorbell FIFO memory is uniquely allocated to the doorbell register;
   wherein the IPC unit is configured to:
   receive, from the source processor, a first memory access request to write a FIFO data entry to the doorbell FIFO memory;
   write the FIFO data entry to the uniquely allocated portion of the doorbell FIFO memory in response to verifying a source id in the first memory access request matches a value stored in a source id register uniquely associated with the doorbell register;
   receive, from the source processor, a second memory access request to write doorbell data to the doorbell register;
   generate, in response to writing of the doorbell data to the doorbell register, an interrupt to the target processor; and
   receive, from the target processor, a third memory access request to read the FIFO data entry from the doorbell FIFO memory.

2. The artificial reality system of claim 1, further comprising:
   a head-mounted display comprising one or more processors configured to output artificial reality content,
   wherein the plurality of processors of the artificial reality system includes the one or more processors of the head-mounted display.

3. The artificial reality system of claim 1, further comprising:
   a System-on-a-Chip (SoC) comprising one or more processors configured to process artificial reality content,
   wherein the plurality of processors of the artificial reality system includes the one or more processors of the SoC.

4. The artificial reality system of claim 1, further comprising:

a peripheral device comprising processors configured to receive one or more inputs from a user of the artificial reality system, wherein the plurality of processors includes the one or more processors of the peripheral device.

5. The artificial reality system of claim 1, wherein the IPC unit further comprises the source id register uniquely associated with the doorbell register, wherein the first memory access request comprises the source id for the source processor.

6. The artificial reality system of claim 1, wherein the IPC unit further comprises a source id register uniquely associated with the doorbell register, wherein the second memory access request comprises a source id for the source processor, and wherein the IPC unit is configured to write the doorbell data to the doorbell status register in response to verifying the source id in the second memory access request matches a value stored in the source id register uniquely associated with the doorbell register.

7. The artificial reality system of claim 1, wherein the IPC unit further includes a target id register associated with the doorbell register, wherein the third memory access request comprises a target id for the target processor, and wherein the IPC unit is configured to transmit the FIFO data entry from the uniquely allocated portion of the doorbell FIFO memory in response to verifying the target id in the third memory access request matches a value stored in the target id register associated with the doorbell register.

8. The artificial reality system of claim 1, wherein the IPC unit is configured to generate, in response to writing of the doorbell data to the doorbell register, one of a high priority interrupt to the target processor or a lower priority interrupt to the target processor.

9. The artificial reality system of claim 1, wherein the IPC unit further comprises:

a plurality of doorbell registers, each of the plurality of doorbell registers uniquely associated with a source processor of the plurality of processors and a target processor of the plurality of processors, and wherein each of the plurality of doorbell registers is associated with a uniquely allocated portion of the doorbell FIFO memory.

10. The artificial reality system of claim 9, wherein the plurality of doorbell registers are organized into a plurality of doorbell groups, and wherein each of the plurality of doorbell groups is uniquely associated with a different target processor of the plurality of processors.

11. The artificial reality system of claim 9, wherein the IPC unit further comprises:

a plurality of doorbell data FIFO memories, and wherein each of the plurality of doorbell registers is associated with a uniquely allocated portion of the plurality of doorbell FIFO memories.

12. The artificial reality system of claim 9, wherein the IPC unit further comprises:

a plurality of doorbell data FIFO memories, wherein the plurality of doorbell registers are organized into a plurality of doorbell instances, and wherein the doorbell registers associated with each doorbell instance share a common one of the plurality of data FIFO memories.

13. A method for inter-processor communication (IPC), the method comprising:

receiving, by an IPC unit from a source processor of an artificial reality system, a first memory access request to write a first-in first-out (FIFO) data entry to a doorbell FIFO memory, wherein a portion of the doorbell FIFO memory is uniquely allocated to a doorbell register that is uniquely associated with a source processor of a plurality of processors and with a target processor of the plurality of processors;

writing, by the IPC unit, the FIFO data entry to the uniquely allocated portion of the doorbell FIFO memory in response to verifying a source id in the first memory access request matches a value stored in a source id register uniquely associated with the doorbell register;

receiving, by the IPC unit from the source processor, a second memory access request to write doorbell data to the doorbell register;

generating, in response to writing of the doorbell data to the doorbell register, an interrupt to the target processor; and receiving, by the IPC unit from the target processor, a third memory access request to read the FIFO data entry from the doorbell FIFO memory.

14. The method of claim 13, wherein the artificial reality system comprises a source id register uniquely associated with the doorbell register, and wherein the first memory access request comprises a source id for the source processor, the method further comprising permitting writing of the FIFO data entry to a portion of the doorbell FIFO memory uniquely allocated do the doorbell register in response to verifying the source id in the first memory access request matches a value stored in a source id register associated with the doorbell register.

15. The method of claim 13, wherein the artificial reality system comprises the source id register uniquely associated with the doorbell register, and wherein the first memory access request comprises the source id for the source processor.

16. The method of claim 13, wherein the artificial reality system comprises a target id register associated with the doorbell register, and wherein the third memory access request comprises a target id for the target processor, the method further comprising permitting reading of the FIFO data entry from a portion of the doorbell FIFO memory uniquely allocated to the doorbell register in response to verifying the target id in the third memory access request matches a value stored in a target id register associated with the doorbell register.

17. The method of claim 13, wherein the doorbell data comprises a first value, the method further comprising, in response to writing of the first value to the doorbell register, generating a high priority interrupt to the target processor.

18. The method of claim 17, wherein the doorbell data comprises a second value different than the first value, the method further comprising, in response to writing of the second value to the doorbell register, generating a low priority interrupt to the target processor.

19. The method of claim 13, further comprising uniquely allocating a portion of the doorbell FIFO memory to each of a plurality of doorbell registers.

20. A non-transitory computer-readable storage medium comprising instructions that, when executed, configure processing circuitry to:

receive, by an inter-processor communication (IPC) unit from a source processor of an artificial reality system, a first memory access request to write a first-in first-out (FIFO) data entry to a doorbell FIFO memory, wherein a portion of the doorbell FIFO memory is uniquely allocated to a doorbell register that is uniquely associated with a source processor of a plurality of processors and with a target processor of the plurality of processors;

write the FIFO data entry to the uniquely allocated portion of the doorbell FIFO memory in response to verifying a source id in the first memory access request matches a value stored in a source id register uniquely associated with the doorbell register;

receive, from the source processor, a second memory access request to write doorbell data to the doorbell register;

generate, in response to writing of the doorbell data to the doorbell register, an interrupt to the target processor; and receive, from the target processor, a third memory access request to read the FIFO data entry from the doorbell FIFO memory.

* * * * *